(12) United States Patent
Ichihara et al.

(10) Patent No.: US 7,136,749 B2
(45) Date of Patent: Nov. 14, 2006

(54) NAVIGATION APPARATUS, NAVIGATION METHOD, ROUTE DATA CREATION PROGRAM, AND SERVER IN NAVIGATION SYSTEM

(75) Inventors: Naohiko Ichihara, Tsurugashima (JP);
Shinichi Sugie, Tsurugashima (JP);
Osamu Yamazaki, Tsurugashima (JP);
Hiroto Inoue, Tsurugashima (JP);
Takehiko Shioda, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 202 days.

(21) Appl. No.: 10/817,951

(22) Filed: Apr. 6, 2004

(65) Prior Publication Data

US 2004/0260466 A1    Dec. 23, 2004

(30) Foreign Application Priority Data

Apr. 9, 2003    (JP)    ............................ P2003-104840

(51) Int. Cl.
*G01C 21/26* (2006.01)
*G01C 21/34* (2006.01)

(52) U.S. Cl. ...................... 701/209; 701/211; 701/202; 340/995.19

(58) Field of Classification Search ........ 701/200–202, 701/208, 209, 211, 24–26, 23; 340/988–990, 340/995.1, 995.19; 342/357.13
See application file for complete search history.

(56) References Cited

U.S. PATENT DOCUMENTS

| 5,568,390 A | 10/1996 | Hirota et al. |
| 6,324,467 B1 * | 11/2001 | Machii et al. .............. 701/200 |
| 6,430,500 B1 * | 8/2002 | Kubota et al. .............. 701/209 |

FOREIGN PATENT DOCUMENTS

| EP | 0 803 708 A2 | 10/1997 |
| EP | 1 265 206 A2 | 12/2002 |
| JP | 3019793 B2 | 1/2000 |

\* cited by examiner

*Primary Examiner*—Y. Beaulieu
(74) *Attorney, Agent, or Firm*—Sughrue Mion, PLLC

(57) ABSTRACT

A system controller 115 includes a table data storage 131 storing table data for calculating the order of priority of each destination, and a priority destination list creator 132 for creating a priority destination list based on the table data in such a manner that priorities of destinations that suit the preferences of the user will set high based on destination conditions set by the user and the stored table data.

12 Claims, 16 Drawing Sheets

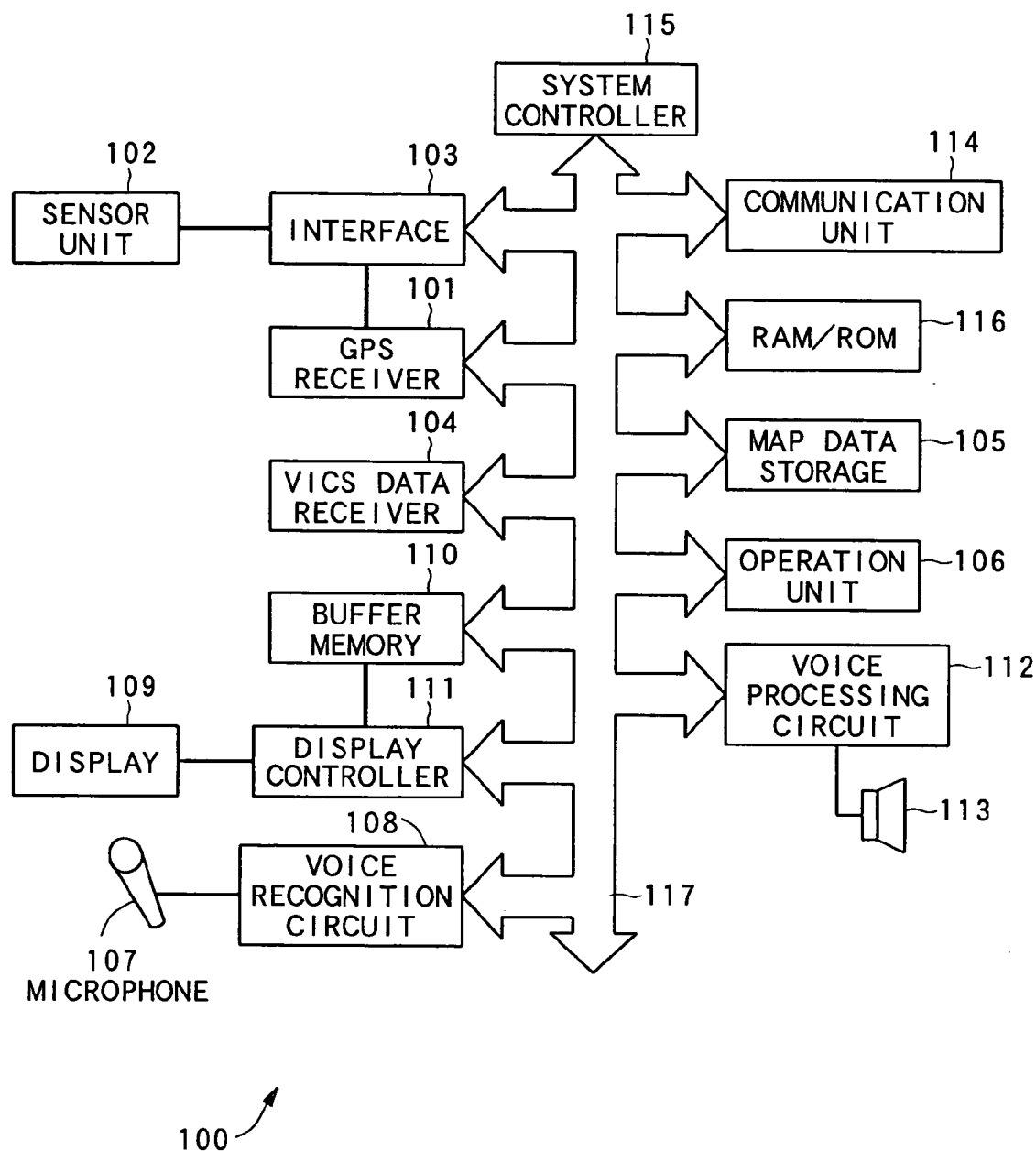

FIG. 2

| NAME DATA | POSITION INFORMATION | | GENRE | AVAILABLE TIME INFORMATION | | | VISITING RECOMMENDED TIME INFORMATION | | STAY TIME INFOR- MATION | KEYWORD |
|---|---|---|---|---|---|---|---|---|---|---|
| | NORTH LATITUDE | EAST LONGITUDE | | START TIME | FINISH TIME | REGULAR HOLIDAY | START TIME | FINISH TIME | | |
| ○○ ART MUSEUM | 35°48'36.0" | 139°40'54.3" | ART MUSEUM | 10:00 | 17:00 | MONDAY | — | — | 1:00 | WALKING AROUND |
| ○○ DEPARTMENT STORE | 35°41'10.2" | 139°42'09.0" | SHOPPING | 10:00 | 20:00 | 10TH, 20TH EVERY MONTH | — | — | 2:00 | — |
| ○○ AMUSEMENT PARK | 35°37'41.0" | 139°53'18.8" | AMUSEMENT | 10:00 | 21:00 | MONDAY | 17:00 | 21:00 | 2:00 | THRILL RIDE |
| ○○ PARK | 35°37'04.8" | 139°38'03.4" | EATING PLACE | 12:00 | 2:00 | — | — | — | — | ANIMAL SHOW |
| ○○ RESTAURANT | 35°30'19.8" | 138°44'30.0" | EATING PLACE | 11:30 | 23:00 | — | 17:00 | 22:00 | 1:00 | FRENCH, NIGHT VIEW |
| ○○ PARK | 35°37'14.3" | 139°40'01.2" | PARK | 8:00 | 21:00 | — | 20:00 | 21:00 | — | CHERRY BLOSSOM |
| ○○ FALL | 36°26'49.5" | 138°38'45.7" | SIGHT SPOT | — | — | — | 14:00 | 16:00 | 0:30 | RED LEAVES |

FIG. 4

| SENSE OF SEASON / KEYWORD | EARLY SPRING | MID-SPRING | LATE SPRING | EARLY SUMMER | MID-SUMMER | LATE SUMMER | EARLY AUTUMN | MID-AUTUMN | LATE AUTUMN | EARLY WINTER | MID-WINTER | LATE WINTER | COUNT |
|---|---|---|---|---|---|---|---|---|---|---|---|---|---|
| CHERRY BLOSSOM | 10 | 8 | 8 | — | — | — | — | — | — | — | — | — | 1 |
| RED LEAVES | — | — | — | — | — | — | 8 | 8 | 10 | — | — | — | 2 |
| THRILL RIDE | 5 | 5 | 5 | 6 | 6 | 6 | 4 | 4 | 4 | 2 | 2 | 2 | 0 |
| ANIMAL SHOW | 10 | 10 | 10 | 6 | 6 | 6 | 10 | 10 | 10 | 6 | 6 | 6 | 0 |
| FRENCH | — | — | — | 10 | 10 | 10 | 8 | 8 | 5 | — | — | — | 2 |
| NIGHT VIEW | 5 | 8 | 10 | 10 | 10 | 10 | 8 | 8 | 5 | — | — | — | 5 |
| WALKING AROUND | 8 | 10 | 10 | 8 | — | — | 10 | 10 | 8 | — | — | — | 2 |

FIG. 5

| PASSENGER / KEYWORD | ALONE | COUPLE | FAMILY | FRIEND | FRIEND COUNT |
|---|---|---|---|---|---|
| CHERRY BLOSSOM | 6 | 10 | 8 | — | 1 |
| RED LEAVES | 6 | 10 | 8 | — | 2 |
| THRILL RIDE | — | 8 | 8 | 8 | 0 |
| ANIMAL SHOW | 4 | 10 | 10 | — | 0 |
| FRENCH | — | 10 | 4 | 4 | 2 |
| NIGHT VIEW | — | 10 | 6 | 10 | 5 |
| WALKING AROUND | 6 | 8 | 6 | 4 | 2 |

FIG. 6

| GENRE \ PASSENGER | ALONE | COUPLE | FAMILY | FRIEND | COUNT |
|---|---|---|---|---|---|
| ART MUSEUM | 10 | 10 | 4 | — | 1 |
| SHOPPING | 6 | 6 | 6 | 6 | 2 |
| AMUSEMENT | — | 8 | 8 | 8 | 0 |
| EATING PLACE | 6 | 6 | 6 | 6 | 0 |
| MUSEUM | 6 | 8 | 10 | — | 2 |
| PARK | 6 | 6 | 6 | 6 | 5 |
| SIGHT SPOT | 6 | 6 | 6 | 6 | 2 |

FIG. 7

| MONTH<br>DESTI-<br>NATION AREA | FIRST/SECOND HALF OF JAN. | FIRST/SECOND HALF OF FEB. | FIRST/SECOND HALF OF MARCH | ... | FIRST/SECOND HALF OF OCT. | FIRST/SECOND HALF OF NOV. | FIRST/SECOND HALF OF DEC. |
|---|---|---|---|---|---|---|---|
| HOKKAIDO | MID-WINTER · MID-WINTER | MID-WINTER · MID-WINTER | LATE WINTER · EARLY SPRING | ... | LATE AUTUMN · EARLY WINTER | MID-WINTER · MID-WINTER | MID-WINTER · MID-WINTER |
| NORTH TOHOKU DISTRICT | MID-WINTER · MID-WINTER | MID-WINTER · MID-WINTER | LATE WINTER · EARLY SPRING | ... | LATE AUTUMN · EARLY WINTER | MID-WINTER · MID-WINTER | MID-WINTER · MID-WINTER |
| SENDAI | MID-WINTER · MID-WINTER | MID-WINTER · LATE WINTER | EARLY SPRING · EARLY SPRING | ... | MID-AUTUMN · LATE AUTUMN | EARLY WINTER · MID-WINTER | MID-WINTER · MID-WINTER |
| SHINSHU | MID-WINTER · MID-WINTER | MID-WINTER · LATE WINTER | EARLY SPRING · EARLY SPRING | ... | MID-AUTUMN · LATE AUTUMN | EARLY WINTER · MID-WINTER | MID-WINTER · MID-WINTER |
| HAKONE | MID-WINTER · MID-WINTER | MID-WINTER · LATE WINTER | EARLY SPRING · EARLY SPRING | ... | MID-AUTUMN · LATE AUTUMN | EARLY WINTER · MID-WINTER | MID-WINTER · MID-WINTER |
| NIKKOU | MID-WINTER · MID-WINTER | MID-WINTER · LATE WINTER | EARLY SPRING · EARLY SPRING | ... | MID-AUTUMN · LATE AUTUMN | EARLY WINTER · MID-WINTER | MID-WINTER · MID-WINTER |
| TOKYO | MID-WINTER · MID-WINTER | MID-WINTER · LATE WINTER | EARLY SPRING · EARLY SPRING | ... | MID-AUTUMN · LATE AUTUMN | EARLY WINTER · MID-WINTER | MID-WINTER · MID-WINTER |

FIG. 15

| NAME DATA | POSITION INFORMATION || ... | STAY TIME INFOR- MATION | SUITABLE SEASON || ... | SUITABLE FELLOW PASSENGER || ... | GENRE ||  |
|---|---|---|---|---|---|---|---|---|---|---|---|---|---|
|  | NORTH LATITUDE | EAST LONGITUDE |  |  | EARLY SPRING | EARLY SUMMER |  | ALONE | FAMILY |  | MUSEUM | PARK |  |
| ○○ ART MUSEUM | 35°48'36.0" | 139°40'54.3" | ... | 1:00 | 10 | 2 | ... | 5 | 5 | ... | 6 | 3 |  |
| ○○ FALL | 36°26'49.5" | 138°36'45.7" | ... | 0:30 | 8 | 8 | ... | 5 | 8 | ... | — | 5 |  |

FIG.16

| GENRE / WEATHER | FINE | CLOUDY | RAIN | SNOW |
|---|---|---|---|---|
| ART MUSEUM | — | 5 | 10 | 10 |
| SHOPPING | 10 | 10 | — | — |
| AMUSEMENT | 10 | 10 | — | — |
| EATING PLACE | 5 | 5 | 5 | 5 |
| MUSEUM | — | 10 | 10 | 10 |
| PARK | 10 | 8 | — | — |
| SIGHT SPOT | 10 | 5 | — | — |

NAVIGATION APPARATUS, NAVIGATION METHOD, ROUTE DATA CREATION PROGRAM, AND SERVER IN NAVIGATION SYSTEM

BACKGROUND OF THE INVENTION

1. Field of the Invention

The present invention relates to the technical field of navigation apparatuses for providing route guidance of movable bodies.

2. Description of Related Art

Recently, navigation apparatuses for assisting traveling of movable bodies, such as vehicles, by displaying a map on a display such as a liquid crystal display panel mounted in a vehicle or the like. Such navigation apparatuses enable the setting of two or more destinations, and route search and guidance to the final destination in orders of user's preference or from the shortest to longest linear distance from the current position.

The latest navigation apparatus can also store and hold route data set prior to traveling to check the traveling route based on the stored data during traveling of a vehicle, or can store and hold the traveling history so that it can be referred to the next time the vehicle travels on the same route (for example, see Japanese Patent No. 3,019,793.

Although the above-mentioned type of navigation apparatus indicates a route from the current position to the final destination via each destination based on the entire travel time and the entire distance, it does not enable the setting of the route while indicating destinations matching user's preferences such as history information on the destinations selected according to the preferences of the user or where the user has visited before.

SUMMARY OF THE INVENTION

The present invention has been made in view of each of the above-mentioned problems, and it is an object thereof to provide a navigation apparatus capable of setting a route while indicating destinations that meet the preferences of each user and the advisability of visiting the destinations.

The above object of the present invention can be achieved by a navigation apparatus provided with: a departure point data acquiring device which acquires departure point data including at least position data on the departure point of a movable body; a destination data storage device which stores multiple pieces of destination data indicating destinations to be visited in such a manner that the destination data will be associated with characteristic information indicating the characteristics of each destination; a registration device which registers destination conditions upon visiting each destination; a setting device which sets the order of visiting priority of the stored destination data on each destination based on the characteristic information and the registered destination conditions; a presentation device which presents the destination data based on the order of priority set out above; a selection device which selects a destination among the presented destination data; a map data storage device which stores map data; a creation device which creates route data from the departure point to the destination based on the departure point data, the registered destination conditions, the selected destination, and the map data; and a route guiding device which provides route guidance from the departure point to the destination based on the created route data.

The above object of the present invention can be achieved by a navigation method provided with: a departure point data acquiring process which acquires departure point data including at least position data on the departure point of a movable body; a destination data acquiring process which acquires multiple pieces of destination data that are stored in a destination data storage device and that indicates destinations to be visited together with characteristic information indicating the characteristics of each destination; a registration process which registers destination conditions upon visiting each destination; a setting process which sets the order of visiting priority of the stored destination data on each destination based on the characteristic information and the registered destination conditions; a presentation process which presents the destination data based on the order of priority set out above; a selection process which selects a destination from among the presented destination data; a creation process which creates route data from the departure point to the destination based on the departure point data, the registered destination conditions, the selected destination, and map data stored in a map data storage device; and a route guiding process which provides route guidance from the departure point to the destination based on the created route data.

The above object of the present invention can be achieved by a computer-readable recording medium on which a route data creation program for creating route data relating to route guidance on a computer is recorded so as to be readable through the computer, provided with: the route data creation program instructs the computer to function as: a departure point data acquiring device which acquires departure point data including at least position data on the departure point of a movable body; a destination data acquiring device which acquires multiple pieces of destination data stored in a destination data storage device and indicating destinations to be visited together with characteristic information indicating the characteristics of each destination; a setting device which sets the order of visiting priority of the stored destination data on each destination based on the characteristic information and destination conditions registered by a registration device upon visiting the destination; a presentation device which presents the destination data based on the order of priority set out above; a creation device which creates route data from the departure point to a destination based on the departure point data, the registered destination conditions, a destination selected from among the presented destination data, and map data stored in a map data storage device; and a route guiding device which provides route guidance from the departure point to the destination based on the created route data.

The above object of the present invention can be achieved by a server in a navigation system provided with: a first receiving device which receives, from a terminal, departure point data including at least position data on the departure point of a movable body in which the terminal is mounted, and destination conditions upon visiting each destination; a destination data storage device which stores multiple pieces of destination data indicating destinations to be visited in such a manner that the destination data will be associated with characteristic information indicating the characteristics of each destination; a setting device which sets the order of visiting priority of the stored. destination data on each destination based on the characteristic information and the registered destination conditions; a sending device which sends the destination data to the terminal so that the destination data will be presented on the terminal in order of priority set out above; a map data storage device which stores map data; a second receiving device which receives, from the terminal, an instruction to select a destination from among the presented destination data; a creation device which creates route data from the departure point to the destination based on the departure point data, the registered destination conditions, and the selected destination received by said receiving devices, and the map data; and a route guiding device which provides route guidance from the departure point to the destination based on the created route data.

BRIEF DESCRIPTION OF THE DRAWINGS

FIG. 1 is a block diagram showing the general structure of a navigation apparatus according to the present invention;

FIG. 2 is a table showing an example of the data structure of point data stored in a map data storage of an embodiment;

FIG. 4 is a table showing an example (I) of the data structure of attribute table data stored in a table data storage of the embodiment;

FIG. 5 is a table showing another example (II) of the data structure of the attribute table data stored in the table data storage of the embodiment;

FIG. 6 is a table showing an example of the data structure of fellow passenger table data stored in the table data storage of the embodiment;

FIG. 7 is a table showing an example of the data structure of season table data stored in the table data storage of the embodiment;

FIG. 15 is a table showing another example of the data structure of the point data stored in the map data storage of the embodiment; and FIG. 16 is a table showing still another example of the attribute information stored in the table data storage of the embodiment.

DESCRIPTION OF THE PREFERRED EMBODIMENT

Figure 3:
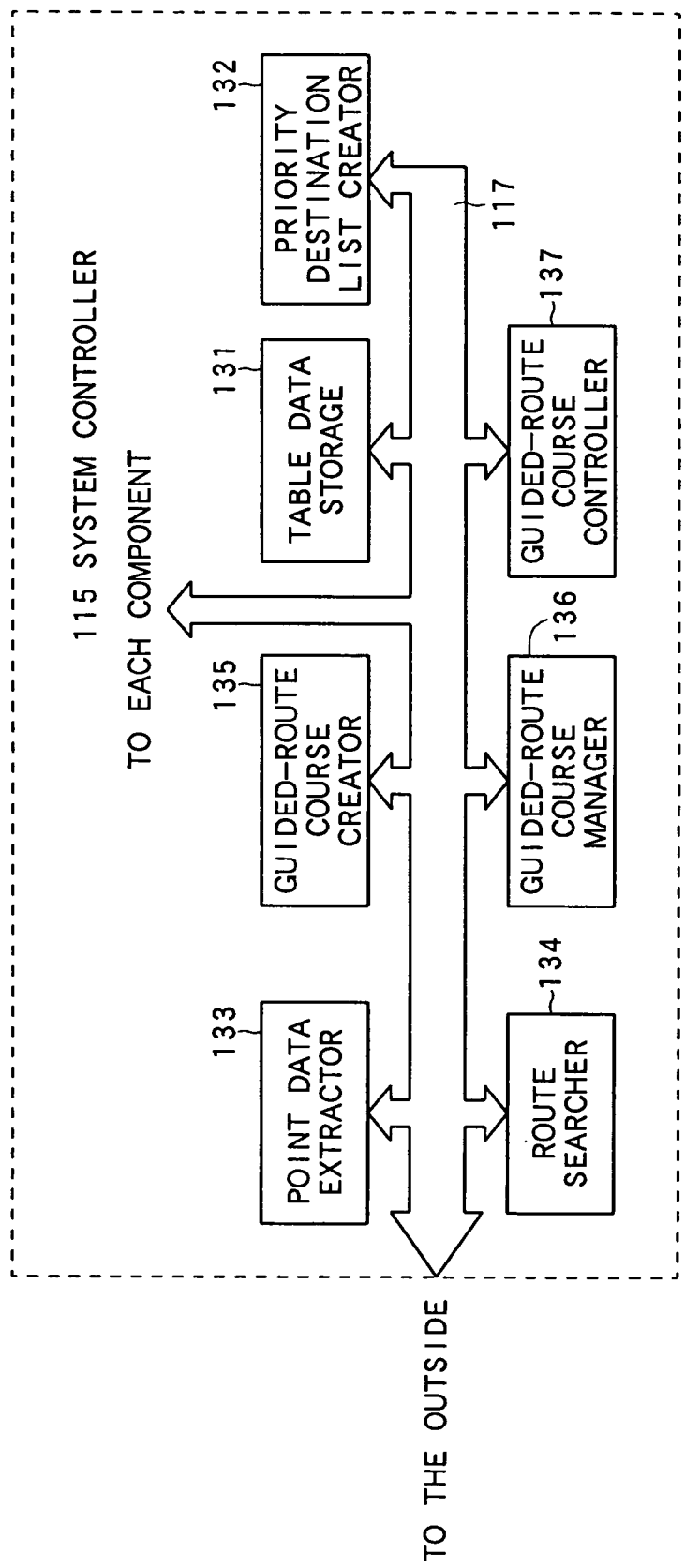
FIG. 3 is a block diagram showing the structure of a system controller of the embodiment according to the present invention.

A preferred embodiment of the present invention will now be described based on the accompanying drawings.

The embodiment to be described below assumes a case where a navigation apparatus according to the present invention is applied to an in-car navigation apparatus.

The general structure and operation of a navigation apparatus in the preferred embodiment will first be described using FIG. 1.

FIG. 1 is a block diagram showing the general structure of navigation apparatus according to the present invention.

As shown in FIG. 1, a navigation apparatus 100 of the embodiment includes: a GPS (Global Positioning System) receiver 101, connected to an antenna AT, not shown, for receiving GPS data; a sensor unit 102 for detecting traveling data such as traveling speed of a vehicle; an interface 103 for calculating the position of the vehicle based on the GPS data and the traveling data; a VICS (Vehicle Information and Communication System) data receiver 104 for receiving VICS data; a map data storage 105 with various kinds of prestored data, such as map data and point data to be described later; an operation unit 106 that enables the user to perform each setting and input commands to the system; a microphone 107 for collecting user's voice; a voice recognition circuit 108 for recognizing a command to the system from the voice collected by the microphone 107; a display 109 for showing the map data and the position of the vehicle; a display controller 111 for controlling the display 109 using a buffer memory 110; a voice processing circuit 112 for creating voice for route guidance or the like; a speaker 113 for amplifying an audio signal outputted from the voice processing circuit 112; a communication unit 114 for communication through the antenna AT via a public telephone network line or the Internet; a system controller 115 for creating route searching/guiding processes, managing the processes in the route guidance, and controlling the entire system to control the route guidance process; and a ROM/RAM 116. Each component is connected to the system controller 115 via the bus 117.

For example, the map data storage 105 of the embodiment constitutes a destination data storage device and a map data storage device according to the present invention. The operation unit 106 of the embodiment constitutes a registration device according to the present invention.

Further, for example, the display 109 of the embodiment constitutes a display device according to the present invention, and the system controller 115 constitutes a route guidance device and a presentation control device according to the present invention.

The GPS receiver 101 receives navigation waves from multiple GPS satellites through the antenna AT, calculates values of pseudo-coordinates of the current position of the movable body based on the received waves, and outputs the calculated values to the interface 103 as GPS data.

The sensor unit 102 detects traveling data on the traveling speeds acceleration, and angle of direction of the vehicle, and outputs the detected traveling data to the interface 103.

Specifically, the sensor unit 102 detects the traveling speed of the vehicle, converts the detected speed to speed data in the form of pulses or voltage, and outputs the speed data to the interface 103.

The sensor unit 102 then compares gravitational acceleration with the acceleration resulting from traveling of the vehicle to detect the traveling state of the vehicle in the up and down directions, converts acceleration data indicating the detected traveling state in the form of pulses or voltage, and outputs the acceleration data to the interface 103.

The sensor unit 102 is also made up of a so-called gyro sensor for detecting the angle of direction of the vehicle, that is, the traveling direction of the vehicle, converts the detected angle of direction to angle of direction data in the form of pulses or voltage, and outputs the angle of direction data to the interface 103.

The interface 103 performs interface processing between the sensor unit 102 and the system controller 115, and the GPS receiver 101 and the system controller 115, calculates the position of the vehicle based on the GPS data and the traveling data inputted, and outputs the position of the vehicle to the system controller 115 as own vehicle position data.

The own vehicle position data is checked against the map data in the system controller 115 to perform matching processing.

The VICS data receiver 104 receives waves such as waves in FM multiplex broadcasting to acquire VICS data, and outputs the acquired VICS data to the system controller 115.

The VICS denotes a road traffic information system, and the VICS data includes road traffic information indicating the occurrence of a traffic jam or accident, and the implementation of traffic regulation orders.

The map data storage 105 may be made up of, for example, a hard disc drive, from which the map data such as a prestored road map, destination point data to be registered in a manner described later, and other information necessary for traveling guidance (hereinafter called "map data and the like") are read out. The read-out map data and the like are outputted to the system controller 115.

The map data and the like include, in addition to the map data including road shape data necessary for navigation, various kinds of associated data such as data on the names and positions of destinations like parks and stores. The various kinds of associated data are stored in association with the road shape data, and the whole map is divided into multiple blocks in such a mesh pattern that map data corresponding to each block will be managed as block map data.

The point data indicating destinations, such as stores, amusement facilities, sight spots, and museums, are also stored in the map data storage 105 together with their names or location names.

The details of the point data stored in the map data storage 105 of the embodiment will be described later.

The operation unit 106 may be made up of a remote control including many keys such as various acknowledge buttons, selection buttons, and a numeric keypad; it is used to input driver's commands such as a display command for viewing the vehicle traveling information and switching of displayed images on the display 109.

Particularly, in the embodiment, the operation unit 106 synchronizes with the display 109 to make possible various operations for registering a destination(s) on a course of route guidance, to be described later, with the system controller 115, or for managing the course during the route guidance based on the registered destination(s).

The operation unit 106 also makes it possible to not only preset information in each point data stored in the map data storage 105 and priorities in each table data to be described later, but also to set each priority according to user's preferences, such as to set stay time information and genre information to be described later.

User's speaking voice or the like is inputted into the voice recognition circuit 108 through the microphone 107. For example, the voice recognition circuit 108 analyzes the speaking voice inputted as an operation command to the navigation apparatus 100, and outputs the analysis results to the system controller 115.

The display 109 may be made up of, for example, CRT type or liquid crystal elements; it shows not only the map data and the like in various manners under the control of the display controller 111, but also various states necessary for route guidance such as the position of the vehicle in such a manner that it will be overlapped on the map data and the like.

The display 109 also shows content information other than the map data and the like, and upon creation of a course of route guidance (hereinafter called a "guided-route course") to be described later, it shows a menu screen of the guided-route course, a select screen for a desired destination search method, a list of destinations stored in the map data storage 105, and a result screen that indicates the guided-route course created. These screens are displayed based on instructions from the system controller 115 through the display controller.

Specifically, upon creation of plan data on a guided-route course to be described later, the display 109 shows not only a destination list, a priority destination list, and a new screen to urge the user to select a setting or the like, all of which will be described later, but also the plan data created, and upon management of the guided-route course based on the plan data created, it shows a change(s) in destination together with the point data and the own vehicle position data.

The map data and the like, and the content data and the like are inputted into the display controller 111 through the system controller 115. The display controller 111 creates display data to be displayed on the display 109 based on instructions from the system controller 115, temporarily stores the display data in the buffer memory 110 so that it will read the display data from the buffer memory 110 at predetermined timings and outputs the same to the display 109.

The voice processing circuit 112 generates an audio signal based on instructions from the system controller 115, and amplifies the generated audio signal through the speaker 113. For example, the voice processing circuit 112 outputs information related to route guidance to the speaker 113 in the form of an audio signal. The information includes the traveling direction of the vehicle at the next intersection, traffic jam information or closed road information to be directly informed to the user for the purpose of traveling guidance.

Particularly, upon creation of plan data to be described later, or upon providing route guidance based on selected route data to be described later, the voice processing circuit 112 also outputs information related to the creation or route guidance to the speaker 113 in the form of an audio signal.

The communication unit 114 is connected to a public telephone network line or the Internet through the antenna AT. Particularly, in the embodiment, it is connected to any server through a line upon creation of a guided-route course to acquire weather information.

The system controller 115 has various kinds of I/O ports such as a GPS receive port, a key input port, and display control port to control overall navigation functionality.

The system controller 115 controls the entire operation of the navigation apparatus 100. The system controller 115 reads out a control program stored in the ROM/RAM 116 to execute each processing, while it temporarily stores data in process in the ROM/RAM 116, thus carrying out control for route guidance.

For example, the system controller 115 searches for a route from the current position to a destination inputted so that it will provide route guidance based on the route searched. When providing route guidance based on the route searched, the system controller 115 performs correction processing such as map matching based on the own car position data and the map data outputted from the interface 103, while it controls the display 109 to show route guidance information on a map indicating a surrounding area including the current position of the vehicle, and controls the voice processing circuit 112 to make voice output of traveling route information and the like.

The system controller 115 also creates, as the user desires, a list of two or more destinations (hereinafter called a "destination list") indicating destinations being visited by the user based on conditions on each destination entered by the user and the prestored table data so that the created destination list will be presented to the user through the display 109 and the voice processing circuit 112. Then, when the user selects and registers a destination(s) from the destination list, the system controller 115 plans a guided-route course based on the registered destination(s) so that the planned course will be presented to the user.

Further, when the user selects the implementation of route guidance based on the planned data on the guided-route course (hereinafter simply called "plan data"), the system controller 115 provides route guidance based on the selected plan data while managing the course.

Details of the creation of the destination list, the creation of the plan data, and the management of route guidance based on the plan data provided by the system controller 115 of the embodiment will be described later.

Referring next to FIG. 2, the point data stored in the map data storage 105 of the embodiment will be described.

FIG. 2 shows an example of the data structure of the point data stored in the map data storage of the embodiment.

Stored in the map data storage 105 in addition to the above-mentioned map data and the like is, for example, the point data indicating destinations, such as stores like restaurants and department stores, places for playing ball games, amusement places like parks and amusement parks, sight spots, art museums, and museums. For example, as shown in FIG. 2, each piece of information is stored in association with name data on its name or place name.

For example, in the embodiment, the point data includes: position information indicating the latitude and longitude of each point; genre information indicating the category of each point or location, such as eating place, visiting place, and amusement facility; available time information indicating the days and hours on which each location is available, such as business hours and opening time, visiting recommended time information indicating the season or time when it is recommended to visit each location, such as a place with a beautiful night view and the best season of cherry blossom viewing; and stay time information indicating expected stay time at each location. This point data is stored in such a manner that these pieces of information will be associated with the position and name of each point on the map.

Specifically, the genre information indicates each genre, for example, eating place, store other than eating place, place for playing ball games, visiting place, or sightseeing spot. When creating plan data on a guided-route course, and when presenting the plan data created, the system controller 115 consults the genre information and displays the information on the display 109.

Upon creation of the plan data, if any piece of point data on the registered destinations does not contain the stay time information, the genre information is used to identify expected stay time at the destination concerned in a manner described later. In the embodiment, although a value of stay time is generally preset or set by the user in each piece of point data as the stay time information, if any piece of point data does not contain the expected stay time, predetermined values of expected stay time, such as, for example, one hour at an eating place, 30 minutes at a sightseeing spot, and two hours at an amusement place, will be set on a genre basis.

The available time information and the visiting recommended time information further include: information on periods of time or dates including seasons such as spring, summer, autumn, and winter; available time such as business hours; and various time information such as opening time and closing time between which it is recommended to visit each location.

In the embodiment, the available time information is not necessarily set in the point data. When any piece of point data without available time is registered as a destination, plan data is created on the precondition that the destination is available 24 hours, 365 days a year.

Further, in the embodiment, the visiting recommended time information is not necessarily limited to a single set of recommended time information per point data, such as a period of time or date, or a set of opening time and closing time, and two or more pieces of visiting recommended time information may be contained in one point data.

Further, in the embodiment, the point data is classified by destination area, and in addition to the genre information, a keyword that can be a characteristic point of each destination is set in the point data as attribute information on each location. For example, in the embodiment, a corresponding keyword is set in each point data as its attribute information, such as a keyword "cherry blossom" indicating a good place of cherry blossom viewing, a keyword "red leaves" indicating a good place of viewing autumnal or red leaves, a keyword "animal show" indicating that there is an animal show at the destination, a keyword "walking around" indicating that the destination has a good spot for enjoyment as you walk around, and a keyword "night view" indicating that the destination includes a place with a beautiful night view.

In the embodiment, the attribute information is used upon creation of the priority destination list to be described later.

Further, in the embodiment, the point data is stored in the map data storage on a target area basis, but the point data on each destination may contain target area information.

Referring next to FIG. 3, the system controller 115 that creates plan data and performs course management based on the plan data will be described.

FIG. 3 is a block diagram showing the structure of the system controller 115 of the embodiment.

As discussed above, the system controller 115 creates, as the user desires, a priority destination list based on conditions on each destination entered by the user and the prestored table data. Then, when the user registers a destination(s) based on the priority destination list concerned, the system controller 115 creates plan data on a guided-route course based on the registered destination(s).

Further, when the user selects the implementation of route guidance based on the plan data, the system controller 115 provides route guidance based on the selected plan data while managing the course.

In order to realize the creation of the priority destination list, the creation of the plan data, and the course management based on the plan data, the system controller 115 of the embodiment includes the following components as shown in FIG. 3: a table data storage 131 storing table data for calculating priority of each destination; a priority destination list creator 132 for creating a priority destination list based on the table data; a point data extractor 133 for extracting point data related to each destination from the priority destination list based on the destination registered; a route searcher 134 for searching for a route based on the extracted point data; a guided-route course creator 135 for creating plan data as a result of route searching based on each point data and departure time inputted; a guided-route course manager 136 for managing the course of route guidance based on the plan data created; and a guided-route course controller 137 for controlling each component relating to the creation and management of the course of route guidance.

For example, the system controller 115 of the embodiment constitutes a selection device, and a destination data acquiring device according to the present invention.

For example, the priority destination list creator 132 of the embodiment constitutes a setting device, a calculating device, and a priority setting device according to the present invention, and the point data extractor 133 constitutes a data acquiring device according to the present invention.

Further, for example, the guided-route course creator 135 of the embodiment constitutes a creation device according to the present invention, and the guided-route course manager 136 constitutes a determination device, a priority setting device, and detection device according to the present invention.

Stored in the table data storage 131 are table data for calculating priorities of destinations (hereinafter called "attribute table data"), table data used for calculating priorities of destinations in combination with the attribute table data (this table data being called "genre table data" below), and season-specific table data for specifying a season for visiting. The attribute table data are associated with destination conditions and attribute information registered through the operation unit 106. The genre table data are associated with the genre information and conditions for the user to visit each destination (hereinafter called destination conditions).

Details of each table data stored in the table data storage 131 of the embodiment will be described later.

The priority destination list creator 132 creates a priority destination list in which destinations that suit the preferences of the user are listed in order of visiting priority based on conditions set by the user (hereinafter called "destination conditions") and the table data stored, and informs the user of the created priority destination list through the display or the speaker.

Specifically, when the user registers destination conditions including the departure time, the category of a fellow passenger(s), and the area of a destination to be visited (hereinafter called a "destination area") through the operation unit, the priority destination list creator 132 consults the table data based on the destination conditions to calculate the priority of each destination stored in the destination area.

After completion of route guidance based on selected route data to be described later, the priority destination list creator 132 holds a list of skipped destinations in a manner described later, creates an unvisiting destination list as a list of unvisiting destinations, and when calculating priorities of the destinations included in the destination list, it adds a predetermined value to the value of the priority of each destination.

Further, the priority destination list creator 132 creates the priority destination list in such a manner that destinations that suit the preferences of the user and exist in the destination area will be listed in order of precedence based on the priority of each destination. In other words, it creates the priority destination list by listing a preset number of high-priority destinations in order of precedence.

Details of the processing for creating the priority destination list by the system controller 115 of the embodiment will be described later.

The point data extractor 133 acquires point data on each destination registered by the user from the map data storage based on the priority destination list, and outputs the acquired point data to the guided-route course creator 135.

Specifically, the point data extractor 133 acquires point data on each destination from the map data storage based on user's instructions registered through the operation unit 106 and the voice recognition circuit 108, and outputs the acquired point data to the guided-route course creator 135.

Specifically, when a destination is registered through the operation unit 106, the point data extractor 133 searches the map data storage 105 based on the registered destination to detect point data on the destination including position information on the destination, the genre information, the available time information, etc., and outputs the detected point data to the route searcher and the guided-route course creator 135.

The point data extractor 133 also searches the map data storage 105 for destinations other than the registered destinations to detect point data on the other destinations (hereinafter called "alternative destinations"). The point data detected are stored in the ROM/RAM 116 on a genre basis.

The alternative destinations are used in the management of a guided-route course to be described later, and set by the guided-route course controller 137.

Upon creation of plan data, the departure time and departure point of the vehicle registered through the operation unit 106 or the voice recognition circuit 108, and point data on each destination extracted by the point data extractor 133 are inputted to the route searcher 134. The route searcher 134 searches for a route from the departure point to each destination, and a route between destinations, based on the departure time and position inputted, and the position information included in the point data, and outputs the results to the guided-route course creator 135.

Specifically, the route searcher 134 searches for all routes or paths between two points, that is, between the departure point and each destination point and between two destinations, and outputs each route between two points to the guided-route course creator 135.

Information on registered departure time is also inputted to the route searcher 134, so that the route searcher 134 acquires traffic information corresponding to the inputted departure time through the communication unit 114, thus searching for a route in consideration of the traffic information.

In the embodiment, the route searcher 134 also performs normal route search processing for searching for a route to a registered destination while referring to the map information stored in the map data storage 105 based on the current position data on the vehicle acquired by the GPS receiver 101 and the point data on each registered destination, and outputs the search results to the display 109 and other necessary components.

Upon creation of plan data, the departure time of the vehicle registered through the operation unit 106 or the voice recognition circuit 108, the point data on each destination extracted by the point data extractor 133, and the route data between the departure point and each destination and between a destination and another destination are inputted to the guided-route course creator 135. The guided-route course creator 135 refers to the departure times, the stay time information and the available time information included in the point data to create plan data on a route from the departure point via each destination, and outputs each created plan data to the display 109 and the voice processing circuit 112.

Upon creation of plan data, the guided-route course creator 135 determines whether visiting times at all the destinations and times of staying at the destinations fall within the respective available time periods included in the available time information. If the visiting time and stay time at each destination fall within the range of available time at the destination, the guided-route course creator 135 outputs the searched route to each component, while if they fall outside the range of available time at the destination, it cancels the plan data.

In the embodiment, the plan data created by the guided-route course creator 135 includes time information indicating the arrival time, departure time, and stay time at each destination, and upon creation of the plan data, the plan data is created in such a manner to include these pieces of time information.

Details of the creation of the plan data by the guided-route course creator 135 of the embodiment will be described later.

When the user selects a piece of plan data thus created, the guided-route course manager 136 performs processing for route guidance (hereinafter called the "route guidance processing") based on the selected plan data.

Specifically, the guided-route course manager 136 not only manages the expected arrival time and the expected departure time at each destination on the selected, guided-route course, but also determines whether the expected arrival time and the expected departure time at a destination that the user has not visited yet (hereinafter called a "unvisiting destination") fall within the available time period included in the point data on the destination, based on the current position data of the vehicle calculated by the GPS receiver 101, and informs the user about the determination results through the display 109 or the speaker 113.

In the embodiment, the expected arrival time and the expected departure time at a unvisiting destination calculated by the guided-route course manager 136 are called below the calculated arrival time and the calculated departure time, respectively, in order to distinguish them from the expected arrival time and the expected departure time at each destination registered in the selected route data.

The guided-route course manager 136 also recreates the course of route guidance included in the selected route data based on user's instructions in response to the determination results. In this case, the guided-route course manager 136 informs the user of recreated plan data (hereinafter called "replan data") through the display 109 and the speaker 113, and based on a user's instruction, it switches route data as the basis for route guidance from the plan data to the replan data.

When replanning the course of route guidance, the guided-route course manager 136 controls the route searcher 134 and the map data storage 105 to create replan data. Details of the creation of replan data by the guided-route course manager 136 of the embodiment will be described later.

The guided-route course controller 137 controls the above-mentioned components regarding the creation of plan data on a guided-route course or the management of the guided-route course based on the selected route data. Especially, the guided-route course controller 137 controls the display 109 the operation unit 106, and the communication unit 114 through the system controller 115 so that the guided-route course controller 137 will resister data necessary to acquire weather information to be described later, and to create the plan data or manage the course of route guidance.

Specifically, upon creation of plan data, the guided-route course controller 137 urges the user to register a rest interval and a rest place or genre information on the rest place through the operation unit 106, and informs the user of the time and place when and where the user will take a rest through the display 109 and the speaker 113 upon providing route guidance based on selected route data.

Upon completion of the creation of the priority destination list, the guided-route course controller 137 sets, as the alternative destinations, top ten high-priority destinations that have not been registered by the user. In this case, as discussed above, the guided-route course controller 137 instructs the point data extractor 133 to detect point data on the alternative destinations and store the point data in the ROM/RAM 116 on a genre basis.

Referring next to FIGS. 4 to 7, each table data stored in the table data storage 131 of the embodiment will be described.

FIGS. 4 and 5 show examples of the data structure of the attribute table data stored in the table data storage 131 of the embodiment, FIG. 6 shows an example of the data structure of the genre table data stored in the table data storage 131 of the embodiment, and FIG. 7 shows an example of the data structure of the season table data stored in the table data storage 131 of the embodiment.

As discussed above, the attribute table data with which the destination conditions and the attribute information are associated, the genre table data with which the genre information and the destination conditions are associated, and the season-specific table data for specifying a season for visiting are stored in the table data storage 131. Further, learnable count data indicating the history of each destination about the number of times the user visits the destination is set in the attribute table data and genre table data.

As shown in FIGS. 4 and 5, the attribute table data is composed of table data assigned priorities in a matrix pattern based on all pieces of attribute information given to point data on each destination and destination conditions set by the destination conditions registered through the operation unit, and count data set for each attribute condition.

In the embodiment, as mentioned above, a keyword that can be a characteristic point of each destination is set in the attribute table data as attribute information.

Further, in the embodiment, as shown in FIGS. 4 and 5, a sense of season in each visiting area and a category of a passenger(s) are, for example, set in the attribute table data as destination conditions, thus giving multiple classifying factors to each destination condition.

Specifically, with the destination conditions classified by sense of season (hereinafter called "season conditions"), four seasons are classified into twelve sections by dividing each season into the beginning, middle, and end of the season as shown in FIG. 4, and with passenger conditions, the following items are set as shown in FIG. 5: "ONLY USER" indicating there is no fellow passenger, "COUPLE" indicating that only a couple or married couple are in the vehicle, "FRIEND" indicating that the user travels with a friend(s), and "family" indicating that the user travels with his or her family member(s).

In the embodiment, all destination conditions but destination conditions indicating senses of seasons, to be described later, are inputted through the operation unit 106. These destination conditions are used in the embodiment. Further, preset rating values are used to assign priority to each destination condition.

Furthermore, in the embodiment, count data is set for each attribute condition, updated in a manner described later, and added to each priority value calculated upon creation of the priority destination list.

The count data in the attribute table data is set by the priority destination list creator 132 in a manner described later after completion of route guidance.

The genre table data is composed of table data assigned priorities in a matrix pattern based on the genre information indicating the categories of destinations classified by purpose and the destination conditions set by the destination conditions registered, and count data set for each piece of genre information.

In the embodiment, as shown in FIG. 6, various genre items, for example, eating place, store other than eating place, amusement place including amusement parks and spectator places or baseball stadiums, viewing place such as art museums or museums, sightseeing place indicating sight spots, are set in the genre table data. Further, in the embodiment, the destination conditions and the count data are set in the same manner as in the attribute datable data.

In the genre table data, although the priority assigned to each genre information can be changed by the user through the operation unit 106, since the priority destination list creator 132 controls, for example, the total sum of priority values calculated under all the search conditions for each attribute condition to fall within a predetermined range of numerical values, an excessive priority cannot be set. However, it is not limited to this case, and the range of numerical values may not be controlled.

The count data in the genre table data is set by the priority destination list creator 132 to increment by one the value of a corresponding piece of count data for a genre or keyword of a place actually visited in a manner described later after completion of route guidance.

As shown in FIG. 7, twenty-four sections corresponding to the twelve months of the year from January to December with each section divided into two sub-sections corresponding to the first half and second half of the month are provided in the season table data, and each half of the month is given one of the twelve classified terms of the beginning, middle, and end of the four seasons. In the embodiment, upon creation of the priority destination list, a sense of season is set for the destination area based on the departure time registered by the user, and to be more specific, based on the departure date.

Details of data update processing such as update of the count data will be described later.

Creation processing for a priority destination list (hereinafter simply called the "list creation processing") by the priority destination list creator 132 of the embodiment will next be described.

As discussed above, the priority destination list creator 132 creates a priority destination list in which destinations that suit the preferences of the user are listed in order of visiting priority based on the destination conditions set by the user and the table data stored. When the user registers respective destination conditions on the departure time, the category of a fellow passenger(s), and the area of a visiting destination(s) through the operation unit 106, the priority destination list creator 132 consults each table data based on the destination conditions to calculate the priority of each destination in the destination area.

Specifically, the priority destination list creator 132 of the embodiment sets a sense of season in the destination area based on the destination area and the departure date and time using the season table data, and more particularly, it determines which month and which half of the month the departure date and time corresponds to in the season table data, and sets a sense of season on the departure date and time in the destination area based on the determined month and first or second half of the month, and the destination area.

Further, in the embodiment, the priority destination list creator 132 acquires the destination conditions on each destination regarding the sense of season set and the registered category of fellow passenger, and each attribute information in the count data, that is, each keyword priority information using the attribute table data, and calculates the priority of each destination based on the acquired priority of each keyword and the attribute information on each destination existing in the destination area registered.

More particularly, the priority destination list creator 132 determines, based on the priority of each of the acquired keywords, whether each of the keywords concerned is included in the attribute information on all the destinations corresponding to the destination area stored in the map data storage. When determining that any keyword is included, the priority destination list creator 132 adds the priority of the keyword acquired from the attribute table data related to the keyword and the priority of the count data related to the keyword for each destination condition to calculate the total priority value for the destination.

When two or more keywords are set as the attribute information in the point data on each destination stored in the map data storage, only the highest priority is added for each destination condition.

Further, the priority destination list creator 132 acquires the priority of the genre information regarding the registered category of fellow passenger as its destination condition and the information on the priority of the count data using the genre table data, calculates the priority of each destination concerned based on the priority of each genre information and the priority of the count data acquired, and the genre information included in the point data on each destination existing in the registered destination area, and adds the calculated priority value to the priority of each destination calculated based on the attribute information.

Furthermore, after completion of route guidance according to the selected route data, the priority destination list creator 132 holds a list of skipped destinations (hereinafter called a "unvisiting destination list"), and when calculating the priority of each destination in the priority destination list, it adds a predetermined value to the value of the priority calculated for each destination included in the unvisiting destination list to create the priority destination list.

The priority destination list creator 132 thus calculates the priority of each destination, and arranges a preset number of high-priority destinations in order of precedence to create the priority destination list.

Processing for creating plan data (hereinafter called the "data creation processing") by the guided-route course creator 135 of the embodiment will next be described.

As discussed above, when creating plan data, the guided-route course creator 135 consults the stay time information and available time information included in the point data to create plan data indicating a route from the departure point via each destination based on the departure time of the vehicle, the point data on each destination, and the route data.

Specifically, the guided-route course creator 135 calculates time required to pass between two points on the route based on the registered departure point and destinations, and the search results of all two points between respective destinations, and creates two or more kinds of plan data from combinations of paths between two points and times required to pass between the two points.

When creating two or more kinds of plan data, the guided-route course creator 135 determines whether visiting times and stay times at all the destinations fall within respective available time periods and visiting recommended time periods, and creates a course of route guidance from the determination results.

For example, in the embodiment, three destinations are registered with the guided-route course creator 135. If these destinations are represented as A point, B point, and C point, respectively, the guided-route course creator 135 calculates a path between the departure point and the A point, B point, or C point and time required to pass between them, a path between the A point and the B point or C point and time required to pass between them, and a path between the B point and the C point and time required to pass between them, and combines the calculated paths between respective points and times required to pass between them to create route data on two or more possible routes passing through respective destinations.

In the embodiment, ten kinds of route data on guided-route courses that are shorter in travel time are determined in principle as plan data based on the required time of each route and the stay time indicated by the stay time information on each destination.

Further, when creating each kind of route data, the guided-route course creator 135 arranges respective destinations in order according to the route data created, and determines whether the expected time of arrival at each destination and the expected departure time are within the available time at the destination that is included in the point data on the destination, based on the departure time set, the time required to pass between respective points, and the stay time information at the destination. When determining that the expected arrival time and the expected departure time are outside the available time at the destination, the guided-route course creator 135 cancels the plan data concerned and outputs only the plan data, which meet the requirement of available time at each destination, to each component as the created plan data.

As discussed above, when the available time information is not included in the point data on each registered destination, the plan data is created on the precondition that the destination is available 24 hours, 365 days a year.

Further, when the visiting recommended information is included in the point data on each destination, the guided-route course creator 135 determines the time of visiting a destination having the visiting recommended information included in each of the created plan data and whether the scheduled stay time at the destination matches the destination visiting recommended time so that the order of presenting the matched plan data to the user will be set high.

Details of processing for setting the order of presenting plan data to the user (hereinafter called ordering processing) will be described later.

As discussed above, when the point data on each registered destination includes genre information on eating place, the guided-route course creator 135 creates a guided-route course in consideration of mealtime.

Specifically, as discussed above, when the point data on any registered destination includes genre information on eating place, the guided-route course creator 135 creates data on a guided-route course in such a manner to arrange the destination at mealtime when creating plan data.

For example, when any restaurant with an expected stay time of one hour is registered as a destination, the guided-route course creator 135 cancels plan data in which the restaurant as a destination is not arranged at lunch time from 11 a.m. to 2 p.m. or at dinner time from 7 p.m. to 9 p.m., and outputs only the plan data with the destination arranged at the set mealtime to each component as the created plan data.

In the embodiment, the range of mealtime is preset by the user in the data creation processing for each plan data or as a rated value.

In the embodiment, when creating plan data, the guided-route course creator 135 performs the ordering processing based on the mealtime in the manner mentioned above. Details of the ordering processing will be described later.

Further, when creating plan data, the guided-route course creator 135 acquires information on weather forecast (hereinafter called "weather forecast information") at registered destinations at which the user will stay for a while or spend time, from any server through the communication unit 114, and incorporates the acquired weather forecast information into information on each destination of the plan data.

In the embodiment, since the weather forecast information is incorporated as destination information in each plan data, when the plan data is displayed on the display 109, the weather forecast for each destination where the user will visit can be displayed on the display 109.

In the embodiment, the plan data is thus created based on the registered destinations, and presented to the user through the display 109 and the like.

Ordering processing for setting the order of priorities by the guided-route course creator 135 of the embodiment will next be described.

When creating plan data, the guided-route course creator 135 calculates the priority of each plan data so that two or more kinds of plan data will be presented to the user based on the calculated order of priorities. In the embodiment, the order of priorities is calculated using preset numerical values of priorities and time required to pass through the entire route in each plan data.

Specifically, the guided-route course creator 135 calculates the priority of each plan data based on the visiting recommended time information and the mealtime, and sets the order of presenting the plan data to the user based on the comprehensive priority calculated for each plan data and the time required to pass through the entire route in each plan data.

In the embodiment, the guided-route course creator 135 determines the order of priorities based on the time required to pass through the entire route calculated when creating each plan data. If the required time of any plan data is within a preset period of time from the required time of higher-priority plan data, and the preset priority of the plan data is high, the order of priorities of the plan data is rearranged.

Further, in the embodiment, when creating each plan data, the guided-route course creator 135 determines whether the arrival time and the departure time at each destination are within the visiting recommended time period included in the point data on the destination, whether an eating place is arranged at the preset mealtime in the created plan data, and whether the arrival time and the departure time at any destination go with the weather forecast information acquired through the communication unit 114. If the plan data on each destination meets the visiting recommended time, or an eating place is arranged at the preset mealtime in the plan data, the guided-route course creator 135 adds a preset priority value to calculate a comprehensive priority of each plan data.

Specifically, in the embodiment, the guided-route course creator 135 arranges all plan data on guided-route courses but cancelled one in order from the shortest to the longest time required for the entire route, and determines whether the expected arrival time or the expected departure time at a destination falls within the period of the visiting recommended time at each destination set in each plan data. If there is a destination(s) that meets the requirement of visiting recommended time in each plan data, only the priority of the destination(s) that meets the requirement of visiting recommended time is set high.

In the embodiment, the time required for the entire route in each plan data is determined by calculating the time required to travel from the departure point to the final destination.

Processing for path management (hereinafter called path management processing) based on the selected route data by the guided-route course manager 136 of the embodiment will next be described.

As discussed above, the guided-route course manager 136 manages the course on a route created based on the selected route data with respect to the expected arrival time and the expected departure time at each destination. If the guided-route course need to be replanned due to later or earlier arrival or departure than the expected arrival time or the expected departure time at the destination, the guided-route course manager 136 controls the guided-route course creator 135, the route searcher 134, and the map data storage 105 through the guided-route course controller 137 to crate replan data.

Specifically, the guided-route course manager 136 determines, at predetermined time intervals or for each destination set in the selected route data, whether the user is likely to arrive later or earlier by a predetermined time or more than the expected arrival time set in the selected route data. When determining that the user is likely to arrive at the destination later or earlier than the expected arrival time, the guided-route course manager 136 informs the user of it so that the guided-route course will be replanned to create replan data based on user's instructions.

In the embodiment, when determining that the user is likely to arrive earlier by a predetermined time or more than the expected arrival time set in the selected route data, the guided-route course manager 136 informs the user of early arrival at the target destination through the display 109 or the speaker 113, alters the visiting sequence of the target destination and another destination or sets a new destination before or behind the target destination, and replans a new guided-route course based on the altered sequence of destinations or the newly set destination on the precondition that it will follow the user's instructions thus creating replan data. Then the guided-route course manager 136 presents the created replan data to the user through the display 109 or the speaker 113.

In the case of setting a new destination, one of the above-mentioned alternative destinations is used. In other words, the guided-route course manager 136 reads one of the alternative destinations from the ROM/RAM 116 to set a new destination.

On the other hand, when determining that the user is likely to arrive later by a predetermined time or more than the expected arrival time set in the selected route data, the guided-route course manager 136 informs the user of late arrival at the target destination through the display 109 or the speaker 113, alters the visiting sequence of the target destination and another destination or deletes the target destination, and replans a new guided-route course based on the altered sequence of destinations or the deletion of the target destination on the precondition that it will follow the user's instructions, thus creating replan data. Then the guided-route course manager 136 presents the created replan data to the user through the display 109 or the speaker 113.

Specifically, in the embodiment, the guided-route course manager 136 performs replanning by controlling the point data extractor 133 the route searcher 134, and the guided-route course creator 135 in the manner mentioned above to acquire point data on a new destination and calculate a path between two points of the new destination and a unvisiting destination so as to create replan data on a guided-route course in the manner mentioned above based on the point data, the route between two points, and the time required to pass through the route.

When deleting the target destination, the guided-route course manager 136 outputs the deleted destination to the priority destination list creator 132 so that the deleted destination will be added to the above-mentioned unvisiting destination list.

Further, the guided-route course manager 136 updates the count data related to the keyword in the point data on each of the destinations passed through and count data related to the genre information on each of the destinations passed through during route guidance or after completion of the route guidance based on the selected route data.

Specifically, in the embodiment, the guided-route course manager 136 increments by one the count data related to the keyword assigned to the destination visited, and increments by one the count data related to the genre of the destination visited. Thus, one cycle of route guidance involves an increment of one at the maximum to update the count data.

For example, in the embodiment, regardless of whether the user visited one destination having the keyword "cherry blossom" and the genre information "park" or two destinations having such a keyword and genre information, each count data is incremented by one to prevent the count data from being excessively incremented.

Figure 8:
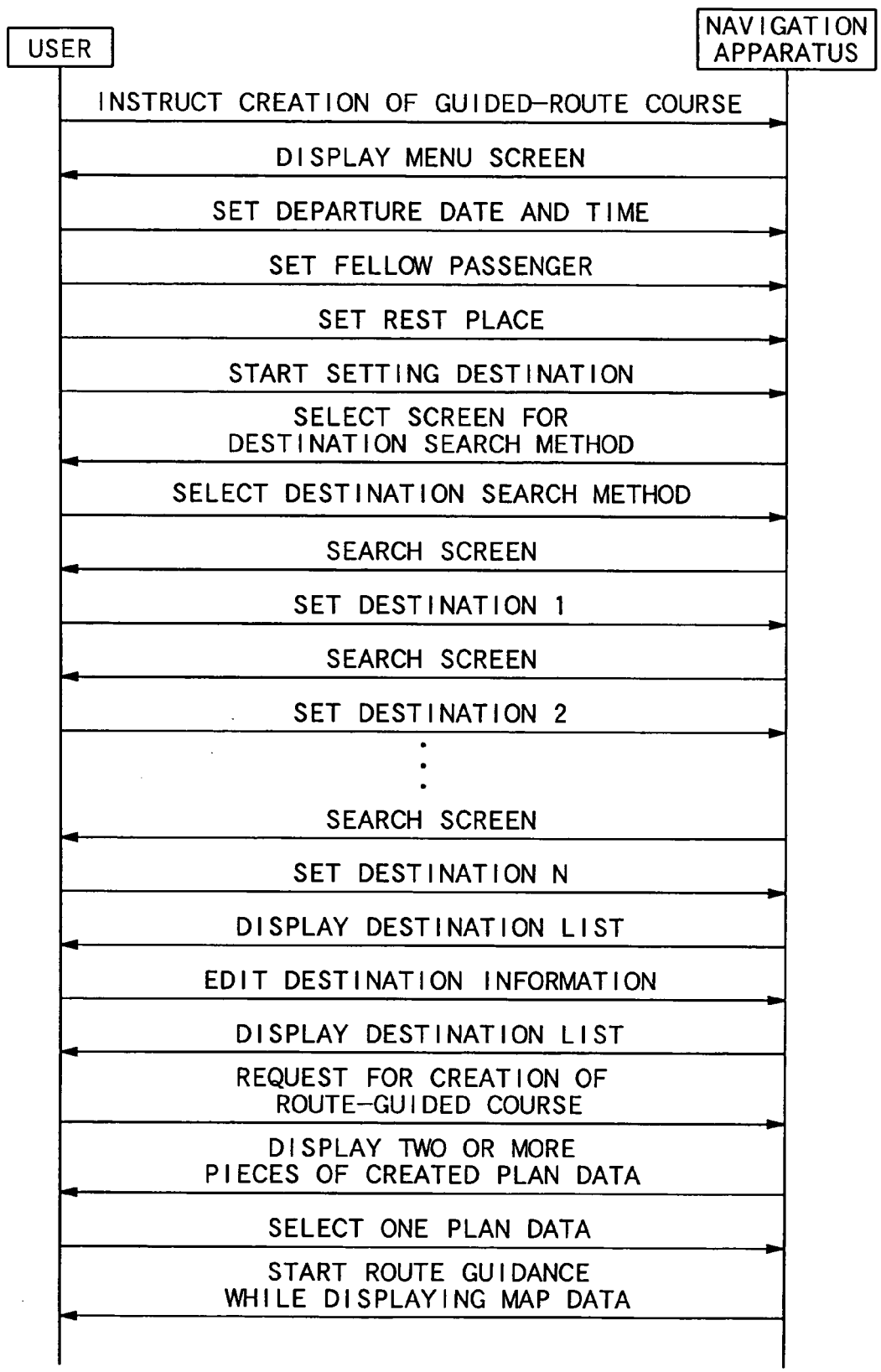
FIG. 8 is a flowchart showing the operation of setting start processing in the embodiment.
Figure 9:
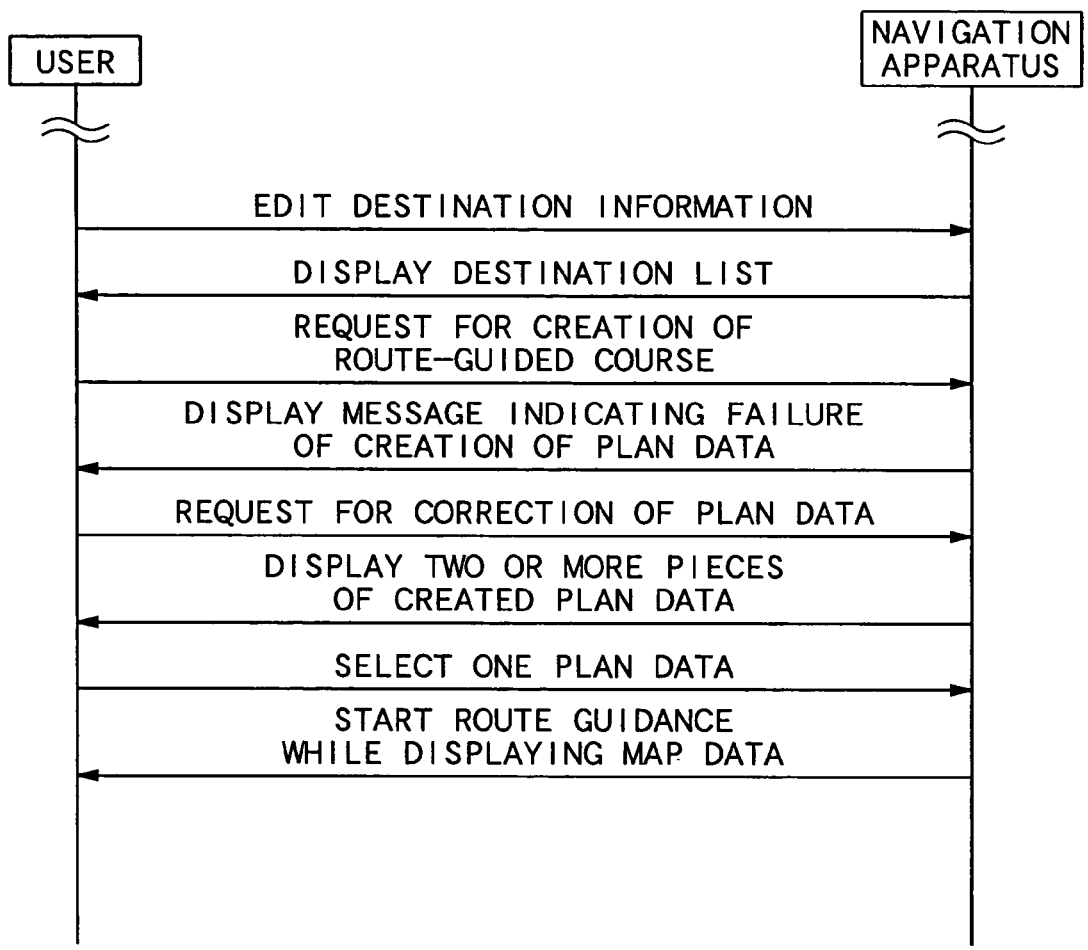
FIG. 9 is a flowchart showing the operation of the setting start processing in the embodiment.

Referring next to FIGS. 8 and 9, the operation of processing for starting route guidance (hereinafter called the "setting start processing") based on the plan data in the embodiment will be described.

FIGS. 8 and 9 are flowcharts showing the operation of the setting start processing in the embodiment.

At first, when an instruction to create a guided-route course from the user is registered through the operation unit 106 with the guided-route course controller 137 in the system controller 115, the guided-route course controller 137 controls the display controller 111 in the manner mentioned above to show on the display 109 a message to urge the user to register information necessary for the creation of a guided route course, and a menu screen for viewing the information.

Then, when the menu screen is displayed, the user sets the departure date and time, the category of fellow passenger, the rest place(s), and the destination area through the operation unit 106 while viewing the menu screen displayed on the display 109, and registers the start of setting of destinations with the guided-route course controller 137. Upon receipt of the user's order, the guided-route course controller 137 controls the priority destination list creator 132 to create a destination list from which the user can select destinations, and display the destination list through the display 109 and the voice processing circuit 112.

Details of list creation processing for the priority destination list by the priority destination list creator 132 will be described later.

The guided-route course controller 137 instructs to display the priority destination list created by the priority destination list creator 132 on a genre basis in order of precedence.

Then, when the created priority destination list is displayed, the user selects destinations through the operation unit 106 while viewing the priority destination list displayed on the display 109. In response to the selection of the user, the guided-route course controller 137 registers the selected destinations in the ROM/RAM 116 so that the ROM/RAM 116 will hold the selected destinations until editing of destination information, that is, the setting of the destinations is completed, and after registration, it instructs to display the search screen again on the display 109.

At this time, the guided-route course creator 135 acquires weather forecast information on each set destination through the communication unit 114 so that the weather forecast information will be informed to the user in association with the destination when informing plan data to the user.

Then, when an instruction from the user to display a list of all the destinations registered by the user, that is, to start editing of destination information through the operation unit 106 is inputted into the guided-route course controller 137, the guided-route course controller 137 instructs to display the list of the registered destinations on the display 109 in the manner mentioned above.

Then, when an instruction from the user to create a guided-route course is inputted into the guided-route course controller 137 through the operation unit 106, the guided-route course controller 137 not only performs processing for creating plan data based on the registered destinations, but also determines whether it is possible to create plan data. If plan data can be created, the created plan data will be displayed on the display 109, while if no plan data can be created, plan data indicating a destination(s) at which the user can not make a stop will be displayed on the display 109.

The operation of the data creation processing for plan data in the embodiment will be described later.

When the guided-route course controller 137 has succeeded in creating plan data, the guided-route course controller 137 starts route guidance based on the plan data selected by the user on the precondition that the user has selected any one of the plan data.

On the other hand, when the guided-route course controller 137 has failed in creating plan data as shown in FIG. 9, the guided-route course controller 137 instructs to display a message on the display 109 to urge the user to make changes in the plan data.

Then, after changes in the plan data are instructed from the user, the guided-route course controller 137 not only performs the processing for creating plan data again based on the information on the changes in the manner mentioned above, but also determines whether it is possible to create plan data.

When determining that plan data can be created based on the changed destinations, the guided-route course controller 137 start route guidance based on the plan data selected by the user in the manner mentioned above on the precondition that the user has selected any one of the plan data.

Figure 10:
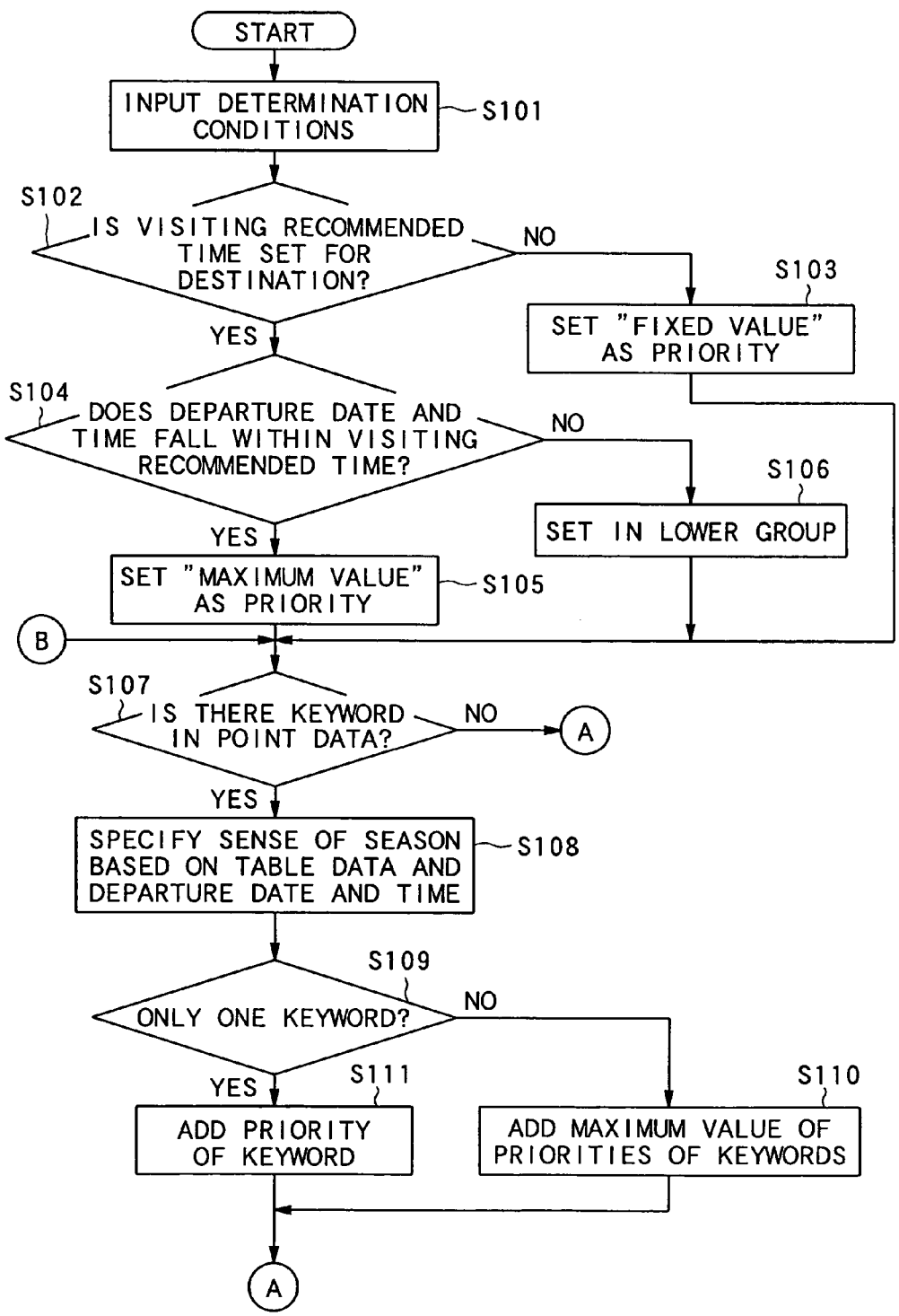
FIG. 10 is a flowchart showing the operation (I) of the list creation processing in the embodiment.
Figure 11:
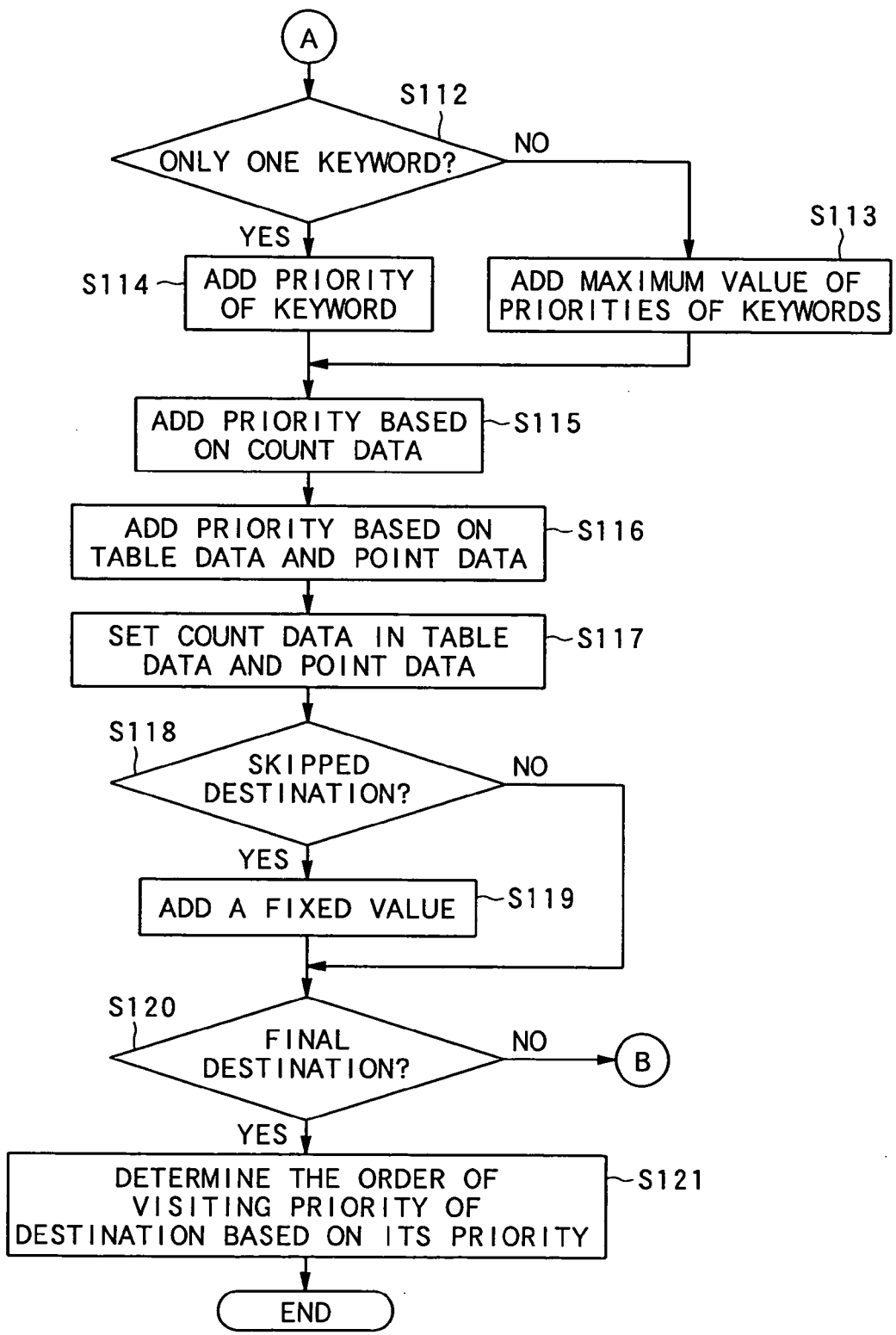
FIG. 11 is a flowchart showing the operation (II) of the list creation processing in the embodiment.

Referring next to FIGS. 10 and 11, the operation of data creation processing for a priority destination list (hereinafter called the "list creation processing") will be described.

FIGS. 10 and 11 are flowcharts showing the operation of the list creation processing.

Note that numerical values are used in the embodiment to indicate priorities.

At first, in the above-mentioned setting start processing, when the departure date and time, the category of fellow passenger, the rest place(s), and the destination conditions in the destination area are set through the operation unit 106 (step S101), the guided-route course controller 137 controls the priority destination list creator 132 to read out point data on each destination belonging in the destination area stored in the map data storage and determine whether visiting recommended time is set in each point data (step S102).

In the embodiment, when the departure date and time does not fall within the range of the available time in the point data, since the priority destination list creator 132 does not, by definition, read the point data concerned from the map data storage, the point data is deleted from the priority list being created.

When determining that the visiting recommended time is not set in the point data, the priority destination list creator 132 sets a preset numerical value as a priority of each destination for which no visiting recommended time is set (step S103). For example, the preset numerical value to be added to the priority is five points.

On the other hand, when the priority destination list creator 132 determines that the visiting recommended time is set in the point data, the guided-route course controller 137 instructs the priority destination list creator 132 to determine whether the departure date and time registered in the setting start processing falls within the visiting recommended time period, that is, whether it is recommended to visit the destination on the departure date and time (step S104).

Then, when determining that the departure date and time registered in the setting start processing does not fall within the visiting recommended time period, the priority destination list creator 132 sets each destination determined not to go with the visiting recommended time as a destination belonging to a lower group (step S105). On the other hand, when determining that the departure time registered in the setting start processing falls within the visiting recommended time period, the priority destination list creator 132 adds the preset maximum value to the destination (step S106).

Specifically, in the embodiment, when determining that the departure date and time falls within the visiting recommended time period, the priority destination list creator 132 sets ten points as the priority of each destination as a destination belonging to an upper group. On the other hand, if the departure date and time does not fall within the visiting recommended time period even though the visiting recommended time is set for the destination concerned, no point will be added as its priority.

Then, the guided-route course controller 137 instructs the priority destination list creator 132 to perform operations described below, for example, in order of storage in the map data storage.

Note that the guided-route course controller 137 does not instruct to calculate the priorities of destinations set in the lower group.

At first, the guided-route course controller 137 instructs the priority destination list creator 132 to determine whether keyword data is given to the point data on each destination (step S107). When the priority destination list creator 132 determines that there is no keyword in the point data on the destination concerned, (for example, OO department store in FIG. 2), the guided-route course controller 137 instructs the priority destination list creator 132 to shift to step S116 in FIG. 11.

On the other hand, when the priority destination list creator 132 determines that there is a keyword(s) in the point data on the destination concerned, the guided-route course controller 137 instructs the priority destination list creator 132 to specify a sense of season based on the season table data stored in the table data storage 131 and the departure date and time indicated by the departure time (step S108).

Specifically, the priority destination list creator 132 acquires the departure date and time from the departure time to specify the sense of season in the destination area on the departure date and time based on the season table data.

Then, the guided-route course controller 137 instructs the priority destination list creator 132 to determine whether the number of keywords set in the point data on the destination is one (step S109). When the priority destination list creator 132 determines that the number of keywords set in the point data on the destination is not one, the guided-route course controller 137 instructs the priority destination list creator 132 to add maximum priority value of the keywords to the priority of each destination based on the attribute table data, the keywords in the point data on the destination, and the sense of season set (step S110).

On the other hand, the priority destination list creator 132 determines that the number of keywords set in the point data on the destination is one, the guided-route course controller 137 instructs the priority destination list creator 132 to add the priority of the keyword to the priority of the destination based on the attribute table data, the keyword in the point data on the destination, and the sense of season set (step S111).

Then, the guided-route course controller 137 instructs the priority destination list creator 132 to determine whether the number of keywords in the point data on the destination is one (step S112). When the priority destination list creator 132 determines that the number of keywords in the point data on the destination is not one, the guided-route course controller 137 instructs the priority destination list creator 132 to add the maximum priority value of the keywords based on the attribute table data, the keywords in the point data on the destination, and the fellow passenger information registered (step S113).

On the other hand, when the priority destination list creator 132 determines that the number of keywords in the point data on the destination is one, the guided-route course controller 137 instructs the priority destination list creator 132 to add a priority value to calculate the priority of the keyword based on the attribute table data, the keyword in the point data on the destination, and the fellow passenger information registered (step S114).

Then, the guided-route course controller 137 instructs the priority destination list creator 132 to read out the count data stored in association with the keyword in the attribute table data and add the value to the priority (step S115).

Then, the guided-route course controller 137 instructs the priority destination list creator 132 to not only add the priority in the point data on the destination based on the table data and the point data on the destination (step S116), but also to read the count data stored in association with the point data from the table data and add the value as the priority (step S117).

Specifically, in the embodiment, the guided-route course controller 137 instructs the priority destination list creator 132 to not only acquire the genre information on each destination from the point data on the destination and add a priority value to the genre based on the genre table data stored in the table data storage 131 and the acquired genre information (step S116), but also to read the count data stored in association with the genre in the genre table data and add the acquired value to the priority (step S117).

Then, the guided-route course controller 137 instructs the priority destination list creator 132 to determine whether the destination is the one that has been registered in the plan data in the previous cycle of route guidance but not actually been visited (hereinafter called the "skipped destination"), that is, whether the destination is stored in the unvisiting destination list (step S118). When the priority destination list creator 132 determines that the destination is a skipped destination, the guided-route course controller 137 instructs the priority destination list creator 132 to add a preset value to the priority (step S119). When the priority destination list creator 132 determines that the destination is not a skipped destination, the guided-route course controller 137 goes to step S120.

Finally, the guided-route course controller 137 instructs the priority destination list creator 132 to determine whether the destination is the final destination stored in the map data storage (step S120) When the priority destination list creator 132 determines that the destination is not the final destination, the guided-route course controller 137 returns to step S107. When the priority destination list creator 132 determines that the destination is the final destination, the guided-route course controller 137 instructs the priority destination list creator 132 to determine the order of visiting priority of the destination in the destination area based on the calculated priority of each destination on a genre basis (step S121). After that, the guided-route course controller 137 ends the processing.

In the embodiment, the priority destination list displayed on a genre basis is created based on the order of priority determined for each destination thus calculated, and presented to the user through the display 109 and the voice processing circuit 112 in the manner mentioned above.

In the embodiment, the user registers destinations through the operation unit 106 based on the priority destination list thus created, and a preset number of top destinations omitted from registration are stored in the ROM/RAM 116 as alternative destinations.

Figure 12:
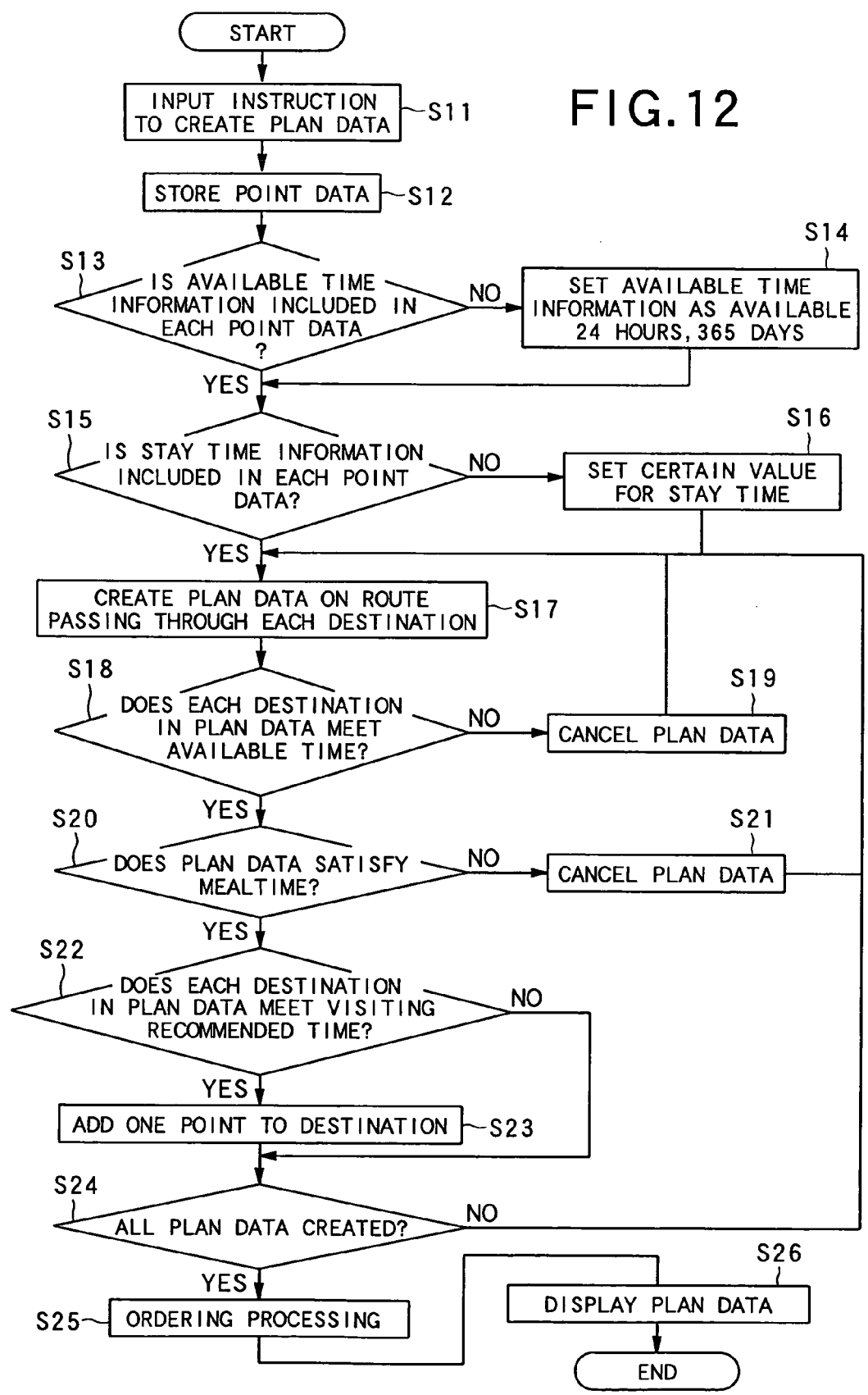
FIG. 12 is a flowchart showing the operation of data creation processing in the embodiment.

Referring next to FIG. 12, the operation of data creation processing for plan data (hereinafter simply called the "data creation processing") in the embodiment will be described.

FIG. 12 is a flowchart showing the operation of the data creation processing in the embodiment.

It is assumed in the embodiment that a destination having the genre information on eating place is always set beforehand, and that the number of plan data calculated by the guided-route course planning means is twenty.

At first, when the user registers destinations through the operation unit 106 based on the priority destination list in the manner mentioned above, and inputs an instruction to create plan data based on the registered destinations into the guided-route course controller 137 (step S11), the guided-route course controller 137 instructs the point data extractor 133 to extract the point data on each registered destination based on the priority destination list and store information of the point data in the ROM/RAM 116 (step S12).

As discussed above, the guided-route course controller 137 also instructs the guided-route course creator 135 to set the alternative destinations, and the point data extractor 133 to extract the point data on each alternative destination and store information of the point data on each alternative destination in the ROM/RAM 116.

Then, the guided-route course controller 137 instructs the guided-route course creator 135 to determine whether available time information is included in each registered point data (step S13). When the available time information is included in each point data, the guided-route course controller 137 goes to the next step S15, while when it is not included in each point data, the guided-route course controller 137 instructs to set the available time in the each point data as available 24 hours, 365 days a year and store the same in the ROM/RAM 116 (step S14).

Then, the guided-route course controller 137 instructs the guided-route course creator 135 to determine whether stay time information is included in each registered point data (step S15). When the stay time information is included in each point data, the guided-route course controller 137 goes to the next step S17, while when it is not included in each point data, the guided-route course controller 137 instructs to set a preset value of expected stay time as the stay time in the each point data, and store the same in the ROM/RAM 116 (step S16).

Then, as discussed above, the guided-route course controller 137 instructs the guided-route course creator 135 to combine the departure point, paths between two destination points, and time required to pass through the route, and create at least one kind of plan data for a route passing through each destination(step S17). The guided-route course creator 135 performs operations mentioned below to create each plan data.

At first, the guided-route course controller 137 instructs the guided-route course creator 135 to determine whether the arrival time and the departure time at any one of the destinations in the created plan data fall within the available time period in the point data on the destination based on the available time information in the point data on each destination included in the created plan data (step S18).

When the guided-route course creator 135 determines that the arrival time and departure time at one or more destinations do not fall within the available time period in the point data on the destination, the guided-route course controller 137 instructs the guided-route course creator 135 to cancel the created plan data (step S19). Then the guided-route course controller 137 goes to step S17 to create the next plan data.

On the other hand, the guided-route course creator 135 determines that the arrival time and the departure time at each of all the destinations in the created plan data fall within each available time period in the point data on each destination, the guided-route course controller 137 instructs the guided-route course creator 135 to determine whether the arrival time and the departure time at each of the destinations having the genre information on eating place fall within preset mealtime period (step S20).

When the guided-route course creator 135 determines that the arrival time and the departure time at each destination as an eating place in the plan data do not fall within the preset mealtime period, the guided-route course controller 137 instructs the guided-route course creator 135 to cancel the create plan data (step S21). Then the guided-route course controller 137 goes to step S17 to create the next plan data.

On the other hand, when the guided-route course creator 135 determines that the arrival time and departure time on the destination as the eating place in the created plan data fall within the preset mealtime period, the guided-route course controller 137 instructs the guided-route course creator 135 to calculate the priority of the created plan data in the manner mentioned above based on the visiting recommended time information on each destination in the created plan data (step S22 S23)

Specifically, the guided-route course creator 135 determines whether the arrival time and the departure time at each destination in the created plan data fall within the visiting recommended time period in the point data on the destination (step S22). If the arrival time and the departure time at the destination do not fall within the visiting recommended time period at the destination, the guided-route course creator 135 goes to step S24 without any particular processing. On the other hand, each time the expected arrival time and the expected departure time at each destination in each plan data fall within the visiting recommended time period, the guided-route course creator 135 adds one point and calculates addition results at all the destinations in the plan data as priorities of the destinations (step S23).

Then, the guided-route course controller 137 instructs the guided-route course creator 135 to determine whether all possible plan data are created (step S24), and if not created, the guided-route course controller 137 returns to step S17.

On the other hand, when the guided-route course creator 135 determines that all possible plan data are created, the guided-route course controller 137 instructs the guided-route course creator 135 to perform the above-mentioned priority ordering processing based on the priority of each plan data (step S25). Then, the guided-route course creator 135 instructs to display the plan data on the display 109 in order of precedence through the guided-route course controller 137 (step S26), and ends the data creation processing.

Further, when the guided-route course creator 135 determines that all possible plan data are created, the guided-route course controller 137 instructs the guided-route course creator 135 to arrange all the created plan data in order from the shortest to the longest time required for the entire route (step S25), and end the creation operation.

In the embodiment, at least one plan data is thus created so that the user will select one plan data through the operation unit 106 based on the displayed plan data.

Further, in the embodiment, the management of route guidance is performed based on the selected plan data in a manner described later.

Figure 13:
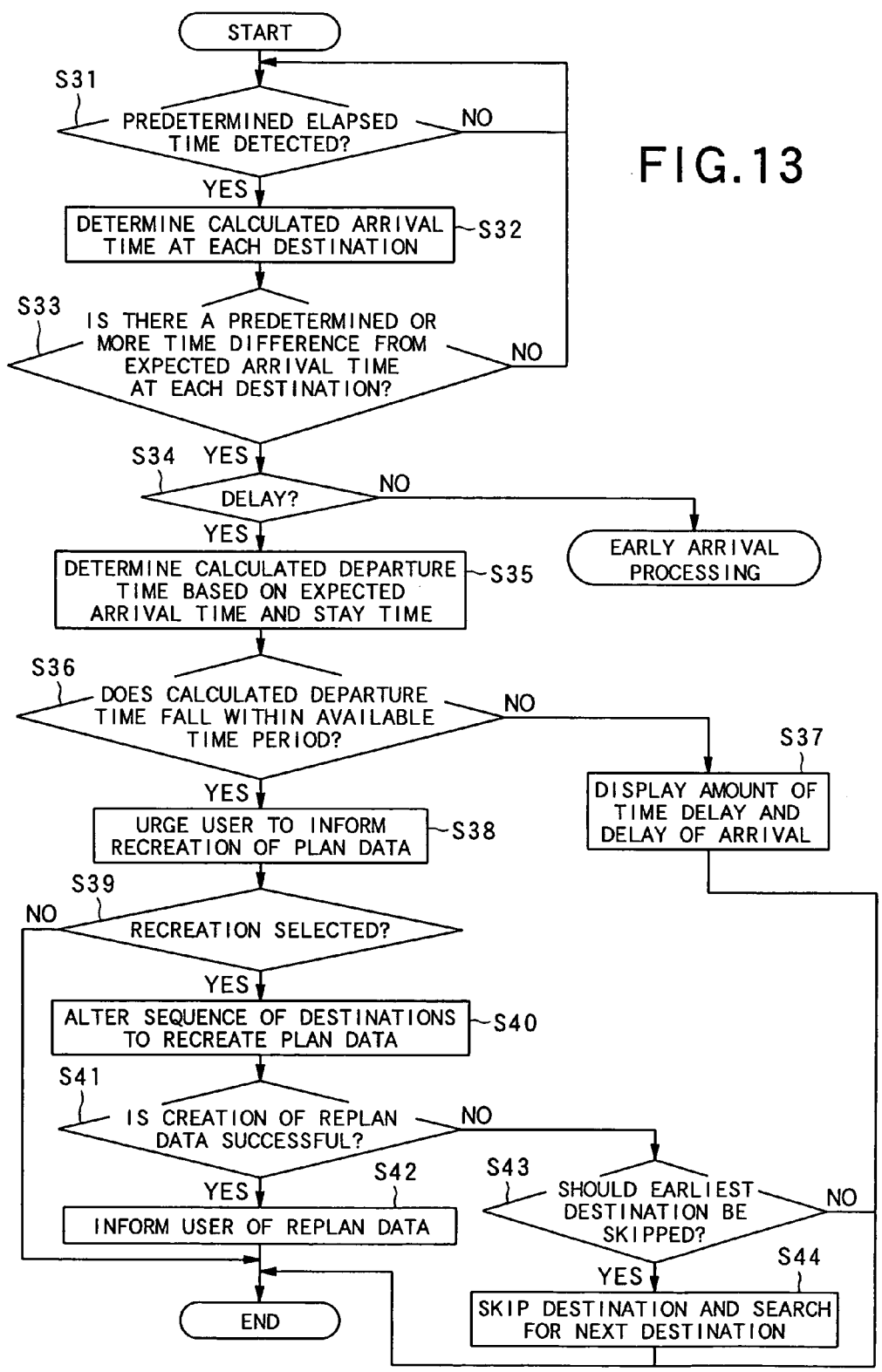
FIG. 13 is a flowchart showing the operation of course management processing in the embodiment.

Referring next to FIG. 13, the operation of course management processing based on the plan data in the embodiment will be described.

FIG. 13 is a flowchart showing the operation of the course management processing in the embodiment.

The course management processing is performed while a vehicle is being guided on a route based on the selected route data, and operations mentioned below are performed at preset time intervals during the route guidance.

At first, when detecting that a preset time has been elapsed during the route guidance (step S31), the guided-route course controller 137 instructs the guided-route course manager 136 to determine the calculated arrival time at each of destinations (unvisiting destinations) that is set in the selected route data but has not been visited by the user yet (step S32).

Then, the guided-route course controller 137 instructs the guided-route course manager 136 to compare the calculated arrival time at each unvisiting destination with the expected arrival time at the unvisiting destination set in the selected route data, and determine whether there is a predetermined or more time difference set for each destination (step S33).

In the embodiment, if a predetermined or more time difference exists between the calculated arrival time and the expected arrival time at one or more unvisiting destinations, the guided-route course manager 136 considers that a predetermined or more time difference exists between the calculated arrival time and the expected arrival time, and determines, for example, whether there is a time difference of ten minutes or more between the calculated arrival time and the expected arrival time at each destination.

When the guided-route course manager 136 determines that a predetermined or more time difference does not exist between the calculated arrival time and the expected arrival time at each unvisiting destination, the guided-route course controller 137 returns to step S31. On the other hand, when the guided-route course manager 136 determines that a predetermined or more time difference exists between the calculated arrival time and the expected arrival time, the guided-route course controller 137 instructs the guided-route course manager 136 to determine whether the predetermined or more time difference is caused by a delay or early arrival (step S34).

When the guided-route course manager 136 determines that the predetermined or more time difference is caused by early arrival, the guided-route course controller 137 shifts from the current operation to early arrival processing to be described later. On the other hand, when the guided-route course manager 136 determines that the predetermined or more time difference is caused by a delay, the guided-route course controller 137 instructs the guided-route course manager 13 to perform course management processing in the case of delay (hereinafter called the "delay processing") as mentioned below.

At first, the guided-route course controller 137 instructs the guided-route course manager 136 to determine the calculated departure time at each unvisiting destination based on the calculated arrival time at each unvisiting destination and the stay time information on the destination (step S35).

Then, the guided-route course controller 137 instructs the guided-route course manager 136 to determine whether the determined, calculated departure time at each unvisiting destination falls within the available time period in the point data on the destination (step S36).

When the guided-route course manager 136 determines that the calculated departure time falls within the available time period at the destination, the guided-route course controller 137 instructs the guided-route course manager 136 through the system controller 115 to inform the user about the amount of time delay and the delay of arrival through the display 109 or the speaker 113 (step S37), and end the course management processing.

On the other hand, when the guided-route course manager 136 determines that the calculated departure time at each unvisiting destination does not fall within the available time period, the guided-route course controller 137 instructs the guided-route course manager 136 to urge the user to send an instruction as to whether to recreate the guided-route course (step S38), and determine the instruction from the user (step S39).

When the user does not select the recreation of the guided-route course and the guided-route course manager 136 determines not to recreate the guided-route course (step S39), the operation is ended.

When the course management processing is ended, the guided-route course controller 137 determines that the user dose not want to recreate the guided-route course, and halts the management operation until the user drives away from the next destination.

On the other hand, when the guided-route course manager 136 informs the user whether to recreate the guided-route course (step S38), and the user selects the recreation of the guided-route course (step S39), the guided-route course controller 137 instructs the guided-route course manager 136 to alter the sequence of unvisiting destinations (step S40) and determine whether the creation of replan data on a guided-route course from at least any one combination of visiting sequences is successful (step S41).

Specifically, in the processing, the guided-route course manager 136 alters the sequence of all the routed patterns of unvisiting destinations to perform the data creation processing for the above-mentioned replan data based on the altered sequence of unvisiting destinations while it determines whether the data creation processing for the above-mentioned replan data can be performed.

If the guided-route course manager 136 can create the replan data from at least any one combination of visiting sequences, the guided-route course controller 137 instructs the guided-route course manager 136 to create replan data in which the earliest unvisiting destination is deleted, and inform the user, through the system controller 115, of the replan data created by deleting the earliest unvisiting destination and the replan data newly created by altering the sequence of unvisiting destinations by means of the display 109 or the speaker 113 (step S42).

In the processing, instead of deleting the earliest unvisiting destination, the user may select a deleted destination through the operation unit 106.

Further, in the processing, if two or more kinds of replan data are created, replan data with the smallest changes in sequence of destinations and the highest priority is set as new replan data created by altering the sequence of unvisiting destinations.

On the other hand, if the guided-route course manager 136 cannot crate replan data on a guided-route course from any combination of visiting sequences, the guided-route course controller 137 instructs the guided-route course manager 136 to urge the user to present an instruction as to whether the earliest unvisiting destination in the selected route data should be deleted through the guided-route course controller 137 by means of the display 109 or the speaker 113 (step S43).

When the user selects the deletion of the earliest unvisiting destination from the selected route data, the guided-route course controller 137 instructs the guided-route course manager 136 to perform deletion processing for deleting the selected unvisiting destination (step S44), control each component so that the route guidance will be provided based on the selected route data, and end the course management processing.

In the processing, instead of deleting the earliest unvisiting destination, the user may select a deleted destination through the operation unit.

On the other hand, when the user does not select the deletion of the earliest unvisiting destination from the selected route data, the guided-route course controller 137 ends the operation directly.

Upon completion of the course management processing, the guided-route course controller 137 determines that the user does not want to recreate the guided-route course, and halts the management operation until the user drives away from the next destination.

Further, the guided-route course controller 137 instructs the priority destination list creator 132 to incorporate the deleted destination into the unvisiting destination list in the manner mentioned above.

Figure 14:
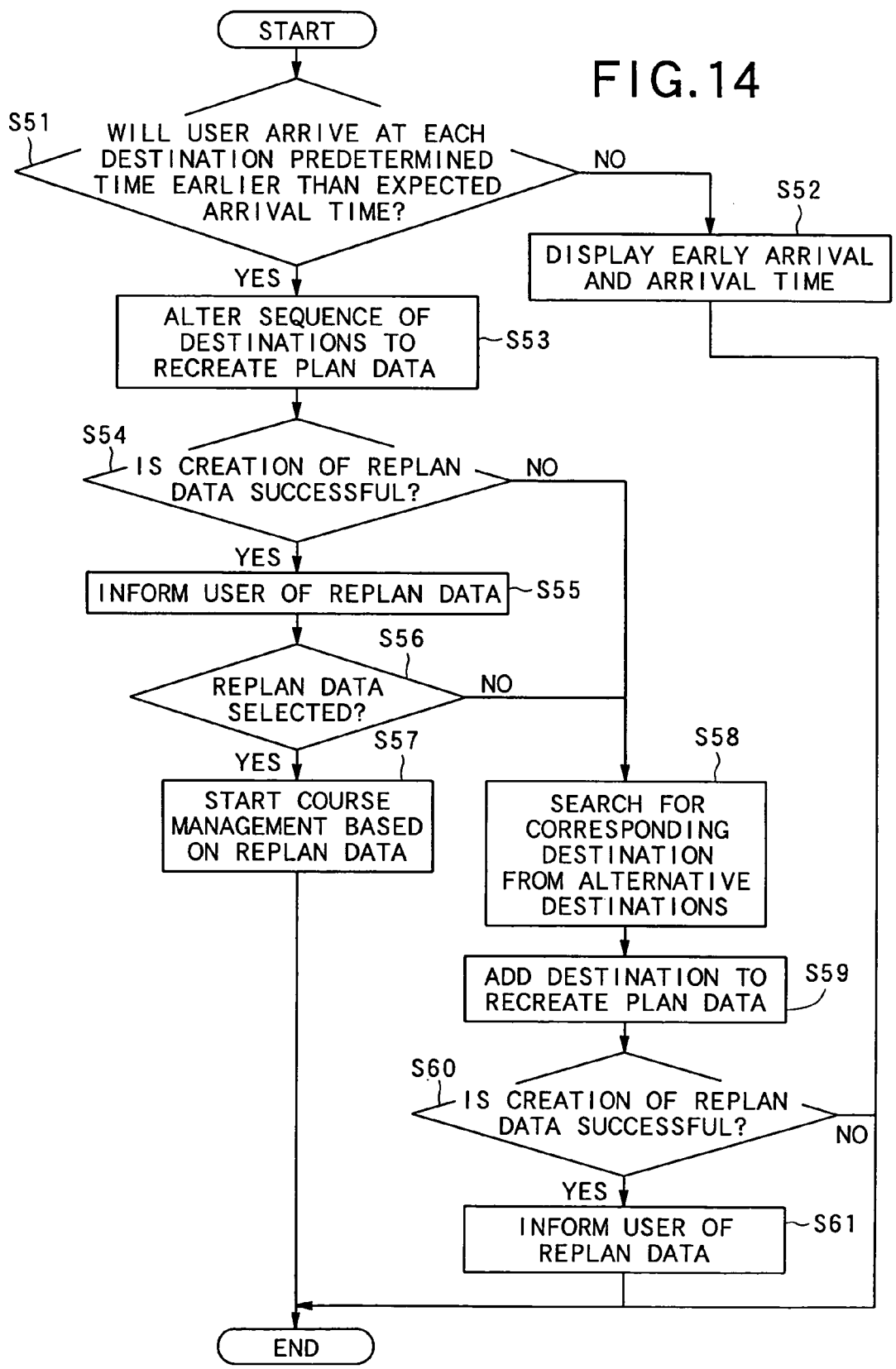
FIG. 14 is a flowchart showing the operation of early arrival processing in the course management processing in the embodiment.

Referring next to FIG. 14, the operation of early arrival processing in the course management processing of the embodiment will be described.

FIG. 14 is a flowchart showing the operation of early arrival processing in the course management processing of the embodiment.

In the embodiment, as discussed above, a preset number of destinations that have not been registered as destinations upon creation of plan data on a guided-route course are prestored in the RAM/ROM 116.

At first, in the above-mentioned step S34, when the guided-route course manager 136 determines that a predetermined or more time different is caused by early arrival, the guided-route course controller 137 instructs the guided-route course manager 136 to compare the calculated arrival time at each unvisiting destination with the expected arrival time at the unvisiting destination set in the selected route data, and determine whether there is a predetermined or more time different between the calculated arrival time and the expected arrival time at the destination (step S51).

In the embodiment, when there is a predetermined or more time different between the calculated arrival time and the expected arrival time at one destination or more, the guided-route course manager 136 considers that there is a predetermined or more time different between the calculated arrival time and the expected arrival time, and determines, for example, whether there is a time difference of twenty minutes or more between the calculated arrival time and the expected arrival time at the destination.

When the guided-route course manager 136 determines that a predetermined or more time difference does not exist between the calculated arrival time and the expected arrival time at each unvisiting destination, the guided-route course controller 137 instructs the guided-route course manager 136 to display the time of arrival and early arrival through the display 109 or speaker (step S52), and end the course management processing.

On the other hand, when the guided-route course manager 136 determines that a predetermined or more time difference exists between the calculated arrival time and the expected arrival time at each unvisiting destination, the guided-route course controller 137 instructs the guided-route course manager 136 to alter the sequence of unvisiting destinations (step S53).

Specifically, in the processing, the guided-route course manager 136 alters the sequence of all the patterns of unvisiting destinations to perform the data recreation processing for the above-mentioned plan data based on the altered sequence of unvisiting destinations.

Then, the guided-route course controller 137 instructs the guided-route course manager 136 to determine whether the creation of new replan data in the processing for altering the sequence of unvisiting destinations is successful (step S54).

Specifically, the guided-route course manager 136 determines whether time required for the entire route in the replan data with small changes in sequence of destinations is shorter than the time required for the entire route in the selected route data destination.

When the guided-route course manager 136 can create new replan data on a guided-route course in the processing for altering the sequence of unvisiting destinations, that is, when the time required for the entire route in the replan data with small changes in sequence of destinations is shorter than the time required for the entire route in the selected route data destination, the guided-route course controller 137 instructs the guided-route course manager 136 to inform the user of the newly created replan data through the display 109 or the speaker 113 (step S55). Then, when the user selects the newly created replan data (step S56), the newly created replan data is set as the selected route data to continue the management of the guided-route course (step S57).

On the other hand, when the guided-route course manager 136 determines that it is not possible to create new replan data on a guided-route course in the processing for altering the sequence of unvisiting destinations, that is, when the time required for the entire route in the replan data with small changes in sequence of destinations is longer than the time required for the entire route in the selected route data destination, or when the user does not select the replan data newly created by altering the sequence of destinations at step S56, the guided-route course controller 137 instructs the guided-route course manager 136 to search for a destinations on the selected route or within a certain range of distance from the route from among the alternative destinations stored in the ROM/RAM 116 in the manner mentioned above upon creation of a guided-route course (step S58).

When the guided-route course manager 136 does not search out any one destination, it sets a destination closest to the route as a new destination, while when the guided-route course manager 136 searches out two or more destinations, it sets a destination on the route indicated by the selected route data or a destination closest to the route as the new destination.

Then, when the guided-route course manager 136 searches out a destination on the selected route or within a certain range of distance from the route from among the alternative destinations stored in the ROM/RAM 116, the guided-route course controller 137 controls the guided-route course creator 135 to add the destination and recreate the plan data from the unvisiting destinations in combination with the added destination, thus creating the above-mentioned replan data (step S59).

In the processing, if two or more kinds of replan data are created, replan data with the smallest changes in sequence of destinations and the shortest time required for the entire route is set as new replan data.

Then, the guided-route course controller 137 instructs the guided-route course manager 136 to determine whether the creation of the replan data on the new guided-route course is successful (step S60).

Specifically, the guided-route course manager 136 determines whether the total sum of time differences between all the expected arrival times in the replan data and all the expected arrival times in the selected route data is shorter than a preset time.

When the guided-route course manager 136 determines that the total sum of time differences between all the expected arrival times in the replan data and all the expected arrival times in the selected route data is shorter than the preset time, the guided-route course controller 137 determines that the creation of the replan data on the new guided-route course is successful, and instructs the guided-route course manager 136 to not only inform the user of the new replan data, but also to set the new replan data as the selected route data (step S61) and control each component to enable route guidance based on the selected route data newly set. After that, the course management processing is ended.

On the other hand, the guided-route course manager 136 determines that the total sum of time differences between all the expected arrival times in the replan data and all the expected arrival times in the selected route data is longer than the preset time, the guided-route course controller 137 determines that it is not possible to create replan data on the new guided-route course, and end the course management processing.

As described above, according to the embodiment, a navigation apparatus 100 includes: a map data extractor for acquiring departure point data including at least position data on the departure point of a movable body; a map data storage 105 for storing two or more kinds of destination data indicating data on destinations to be visited in association with attribute information indicating characteristics of the destinations, and map data; an operation unit 106 for registering destination conditions upon visiting each destination and selecting a destinations from the destination data presented in a manner described later; a priority destination list creator 132 for setting visiting priority to each piece of stored destination data based on the attribute information and the registered destination conditions; a display 109 and a voice processing circuit 112 for presenting the destination data in order of priority set out above; a guided-route course creator 135 for creating route data from the departure point to each destination based on the departure point data, the registered destination conditions, the selected destination(s), and the map data; and a system controller 115 for enabling route guidance from the departure point to each destination based on the created route data.

According to this structure, the embodiment is such that a priority destination list for setting the order of visiting priority of each piece of stored destination data based on the attribute information and the registered destination conditions, so that when the user selects a destination(s) from the priority destination list based on the created priority destination list, a route is set based on the selected destination(s) and route guidance is provided based on the set route.

Consequently, the embodiment not only makes it easy for the user to register destinations that suit the preferences of the user as a destination to be visited, but also solves complicated registration problems, thus improving the operability of the navigation apparatus 100.

Further, in the embodiment, the priority destination list creator 132 sets visiting priority to each of the stored destination data based on the priority preset for each kind of destination condition and each kind of attribute information, and indicating whether each destination is suitable for visiting according to the attribute information on each kind of destination condition, and the attribute information stored in association with each piece of destination data.

According to this structure, the embodiment is such that, upon setting of priority to each piece of point data on each destination stored in the map data storage 105, the order of priority of each destination can be set by recording only the attribute information such as keywords in the point data without the need to set any reference priority. It allows not only the point data on each destination to have versatility, but also the same database to take care of multiple users because the order of priority of destinations can easily be altered by changing only the registered conditions.

Further, the embodiment is such that when two or more destination conditions are set through the operation unit 106, the priority destination list creator 132 calculates the priority of each piece of destination data based on the priority preset for each kind of destination condition and each kind of attribute information, and the attribute information stored in association with each piece of destination data, and sets the order of visiting priority of each destination based on the priority of each destination calculated for each of the destination conditions.

According to this structure, the embodiment is such that upon setting of the order of priority of each piece of point data on each destination stored in the map data storage 105, the priority of each destination can be set by recording only the attribute information such as keywords in the point data without the need to set any reference priority. It allows not only the point data on each destination to have versatility, but also the same database to take care of multiple users because the order of priority of destinations can easily be altered by changing only the registered conditions.

Further, the embodiment includes guided-route course manager 136 that determines, upon presetting of priority, whether visiting of each destination included in the route data created by the guided-route course creator 135 will end up or has ended up successful either during route guidance or after completion of the route guidance to preset priority based on the registered destination conditions, the attribute information, and the advisability of visiting the destination.

According this structure, the embodiment is such that the priority of a destination that the user was not able to visit because of a delay from the scheduled time or the like is set higher so that the priority of the destination that the user was not able to visit can be set higher the next time the priority destination list is created. This makes it possible not only to register destinations that suit the preferences of the user as destinations to be visited, but also solves complicated registration problems, thus improving the operability of a navigation apparatus 100.

Further, the embodiment is such that when determining that the user visited a destination included in the route data, the guided-route course manager 136 detects the number of times the user has visited the destination from the attribute information on the destination to be visited, and the priority destination list creator 132 sets priority based on the registered destination conditions, the attribute information, and the number of visiting times.

According to this structure, since the embodiment makes it possible to set priority to each destination based on the number of visiting times in addition to the registered destination conditions and the attribute information, destinations that suit the preferences of the user can easily be registered.

In the embodiment, although each piece of table data is stored in a table data storage 131 so that priority of each destination will be calculated based on the stored table data and the registered destination conditions, priority may be given to a suitable season, an suitable fellow passenger(s), and a related genre in the point data on each destination stored in the map data storage, instead of the table data, in a manner as shown in FIG. 15, as well as priority of each destination calculated based on the registered destination conditions, so that the order of priority of each destination will be set based on the priority of each destination.

Further, in the embodiment, although the genre table data is stored in the table data storage 131 so that priority of each destination will be calculated based on the stored genre table data and the registered destination conditions on the category of fellow passenger, priority of each weather condition in genre information as shown in FIG. 16 may be acquired so that this priority will be added to the priority of each destination. In this case, a priority destination list can be created in consideration of the weather condition at the destination on the departure date.

Further, in the embodiment, although the count data is given to each table data and updated based on the history of route guidance so that the preferences of the user can be reflected in the table data, user data with categories of fellow passenger, fields of interest, favorite genres, etc. preset in it may be stored in the table data storage 131 so that priority of each destination will be calculated based on the user data and the registered destination conditions, thus setting the order of priority of each destination based on the priority of each destination.

For example, priority may be preset to each piece of user data, such as fields of interest like sports and literature, the categories of fellow passenger indicating family members like wife, eldest son, and eldest daughter, and favorite genres like museum, art museum, park, etc., and upon calculation of priority of each destination, the preset priority value may be added to the priority of each destination indicating any of the fields of interest, the categories of fellow passenger, and the favorite genres. In this case, note that family-related information such as "for grade school children" should be preset in the point data on each destination together with genre information in association with data related to fellow passengers indicating family structure, and data on the fields of interest should be set in association with respective keywords.

In this case, the fields of interest, the family structure, and these priorities are preset through the operation unit 106.

Further, in the embodiment, after completion of route guidance based on the selected route data, the unvisiting destination list as a list of destinations that are skipped from the selected route course but will possibly be visited in the future is held so that the order of priority of each destination will be set based on the unvisiting destination list next time the user drives along the same route. However, instead of the use of the unvisiting destination list, the point data on each destination stored in the map data storage may be flagged so that the map data extractor will add a priority value based on the presence or absence of a flag to calculate priority of each destination.

Further, in the embodiment, upon creation of plan data as route data in the route management processing, an additional destination on the selected route is searched out based on the preset alternative destinations, but the route management processing may be such that destinations already set in the selected route data may be eliminated in the list creation processing in the embodiment so that calculated high-priority destinations will be set as alternative destinations.

Further, in the embodiment, the navigation apparatus 100 is such that the priority destination list creator 132 sets the order of priority of each destination and presents the order to the user, but the navigation apparatus 100 may be provided with a computer and an information recording medium for storing the point data and the map data so that a list creation program, a route data creation program, and a management program will be stored on the recording medium, allowing the computer to read each of the programs to execute the list creation processing, the data creation processing, or the management processing in the same manner as in the embodiment mentioned above.

Further, in the embodiment, the navigation apparatus of the present invention is applied to an in-car navigation apparatus, but each of the features in the system controller 115, that is, the priority destination list creator 132, the table data storage 131, the point data extractor 133, the route searcher 134, the guided-route course creator 135, the guided-route course manager 136, and the guided-route course controller 137 may be provided in a server installed at any location so that an in-car terminal will communicate with the server through a communication line, such as a public telephone network line or the Internet to instruct the server to execute the list creation processing, the data creation processing, and the management processing.

In this case, the server stores for each vehicle various kinds of data such as plan data necessary for the list creation processing, the data creation processing, and the management processing, while the terminal has a communication unit for communication with the server, so that various kinds of registered data are sent through the communication unit, and plan data and control data for controlling route guidance are exchanged through the communication unit, thus performing the list creation processing, the data creation processing, and the management processing.

For example, the server of the embodiment constitutes a first receiving device, a sending device, and a second receiving device according to the present invention.

Further, in the embodiment, the navigation apparatus of the present invention is applied to an in-car navigation apparatus, but it may be applied to a portable terminal for pedestrian use.

In this case, instead of the GPS receiver 101 and the sensor unit 102, the current position information on the portable terminal is acquired by a current position information acquiring part on the portable terminal using a communication wave.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-104840 filed on Apr. 9, 2003 including the specification, claims, drawings and summary is incorporated herein by reference in its entirety.

What is claimed is:

1. A navigation apparatus comprising:
   a departure point data acquiring device which acquires departure point data including at least position data on the departure point of a movable body;
   a destination data storage device which stores multiple pieces of destination data indicating destinations to be visited in such a manner that the destination data will be associated with characteristic information indicating the characteristics of each destination;
   a registration device which registers destination conditions upon visiting each destination;
   a setting device which sets the order of visiting priority of the stored destination data on each destination based on the characteristic information and the registered destination conditions;
   a presentation device which presents the destination data based on the order of priority set out above;
   a selection device which selects a destination among the presented destination data;
   a map data storage device which stores map data;
   a creation device which creates route data from the departure point to the destination based on the departure point data, the registered destination conditions, the selected destination, and the map data; and
   a route guiding device which provides route guidance from the departure point to the destination based on the created route data.

2. The navigation apparatus according to claim 1, wherein said setting device sets the order of visiting priority of each of the stored destination data based on the priority preset for each kind of destination condition and each kind of attribute information and indicating whether each destination is suitable for visiting according to the attribute information on each kind of destination condition, and the attribute information stored in association with each piece of destination data.

3. The navigation apparatus according to claim 2, wherein, after said registration device sets the multiple destination conditions,
said setting device further comprises:
a calculation device which calculates priority of each piece of destination data for each of the destination conditions based on the priority preset for each kind of destination condition and each kind of attribute information, and on the attribute information stored in association with each piece of destination data; and
a priority order setting device which sets the order of visiting priority of each destination based on the priority of each destination calculated for each of the destination conditions.

4. The navigation apparatus according to claim 1, further comprising:
a determination device which determines, upon presetting of the priority, whether visiting of each destination included in the route data created by said creation device will end up or has ended up successful either during route guidance or after completion of the route guidance; and
a priority setting device which presets the priority based on the registered destination conditions, the attribute information, and the advisability of visiting the destination.

5. The navigation apparatus according to claim 4, further comprising
a detection device which detects the number of times the user has visited the destination from the characteristic information on the destination visited, when said determination device determines that the user visited a destination included in the route data,
wherein said priority setting device sets the priority based on the registered destination conditions, the attribute information, and the number of visiting times.

6. The navigation apparatus according to claim 1, wherein said registration device registers, as each of the destination conditions, at least one of the departure date and time, a fellow passenger, the destination area, user's age, and weather information indicating the weather condition at each visiting destination.

7. The navigation apparatus according to claim 6, wherein when said registration device registers the departure date and the destination area as the destination conditions, said setting device specifies a sense of season indicating the season in the destination area based on the departure date and the destination area, and sets the order of priority of each piece of stored destination data based on the sense of season specified.

8. The navigation apparatus according to claim 1, wherein the characteristic information stored in said destination data storage device for each piece of destination data includes at least one of attribute information indicating the attributes of each destination, genre information indicating the type of each destination, fellow passenger information indicating a fellow passenger suitable for visiting the destination with, cost information indicating the cost for visiting the destination, and weather information indicating the weather condition suitable for visiting the destination.

9. The navigation apparatus according to claim 8, wherein the multiple destination data are stored in said destination data storage device in association with keyword data indicating keywords as the attribute information.

10. A navigation method comprising:
a departure point data acquiring process which acquires departure point data including at least position data on the departure point of a movable body;
a destination data acquiring process which acquires multiple pieces of destination data that are stored in a destination data storage device and that indicates destinations to be visited together with characteristic information indicating the characteristics of each destination;
a registration process which registers destination conditions upon visiting each destination;
a setting process which sets the order of visiting priority of the stored destination data on each destination based on the characteristic information and the registered destination conditions;
a presentation process which presents the destination data based on the order of priority set out above;
a selection process which selects a destination from among the presented destination data;
a creation process which creates route data from the departure point to the destination based on the departure point data, the registered destination conditions, the selected destination, and map data stored in a map data storage device; and
a route guiding process which provides route guidance from the departure point to the destination based on the created route data.

11. A computer-readable recording medium on which a route data creation program for creating route data relating to route guidance on a computer is recorded so as to be readable through the computer, wherein the route data creation program instructs the computer to function as:
a departure point data acquiring device which acquires departure point data including at least position data on the departure point of a movable body;
a destination data acquiring device which acquires multiple pieces of destination data stored in a destination data storage device and indicating destinations to be visited together with characteristic information indicating the characteristics of each destination;
a setting device which sets the order of visiting priority of the stored destination data on each destination based on the characteristic information and destination conditions registered by a registration device upon visiting the destination;
a presentation device which presents the destination data based on the order of priority set out above;
a creation device which creates route data from the departure point to a destination based on the departure point data, the registered destination conditions, a destination selected from among the presented destination data, and map data stored in a map data storage device; and
a route guiding device which provides route guidance from the departure point to the destination based on the created route data.

12. A server in a navigation system comprising:
a first receiving device which receives, from a terminal, departure point data including at least position data on the departure point of a movable body in which the terminal is mounted, and destination conditions upon visiting each destination;
a destination data storage device which stores multiple pieces of destination data indicating destinations to be visited in such a manner that the destination data will be associated with characteristic information indicating the characteristics of each destination;

a setting device which sets the order of visiting priority of the stored destination data on each destination based on the characteristic information and the registered destination conditions;

a sending device which sends the destination data to the terminal so that the destination data will be presented on the terminal in order of priority set out above;

a map data storage device which stores map data;

a second receiving device which receives, from the terminal, an instruction to select a destination from among the presented destination data;

a creation device which creates route data from the departure point to the destination based on the departure point data, the registered destination conditions, and the selected destination received by said receiving devices, and the map data; and a route guiding device which provides route guidance from the departure point to the destination based on the created route data.

* * * * *